United States Patent [19]

Honma et al.

[11] Patent Number: 5,426,847

[45] Date of Patent: Jun. 27, 1995

[54] ASSEMBLING APPARATUS FOR A HEAT EXCHANGER

[75] Inventors: Kensaku Honma; Masahide Sakaguchi, both of Tokyo, Japan

[73] Assignee: Hidaka Seiki Kabushiki Kaisha, Tokyo, Japan

[21] Appl. No.: 83,186

[22] Filed: Jun. 29, 1993

[30] Foreign Application Priority Data

Jul. 2, 1992 [JP] Japan .................................. 4-200539

[51] Int. Cl.⁶ .............................................. B23P 15/26
[52] U.S. Cl. ...................................... 29/726; 29/33 G; 29/726.5
[58] Field of Search ...................... 29/726, 726.5, 727, 29/33 G, 792, 793, 795, 799

[56] References Cited

U.S. PATENT DOCUMENTS

| | | | |
|---|---|---|---|
| 3,789,479 | 2/1974 | Zifferer et al. | 29/726 |
| 4,380,106 | 4/1983 | Jonason | 29/726 |
| 4,486,933 | 12/1984 | Iwase et al. | 29/726 |
| 4,543,711 | 10/1985 | Wada et al. | 29/726.5 |
| 4,589,198 | 5/1986 | Greever et al. | 29/799 |
| 4,674,181 | 6/1987 | Hamada et al. | 29/799 |
| 4,913,707 | 4/1990 | Moreno et al. | 29/792 |
| 5,182,850 | 2/1993 | Kondo et al. | 29/799 |
| 5,226,234 | 7/1993 | Beddome et al. | 29/726 |
| 5,228,191 | 7/1993 | Casterline | 29/726.5 |

*Primary Examiner*—Irene Cuda

[57] ABSTRACT

The present invention provides an assembling apparatus for a heat exchanger, which is capable of certainly coinciding ends of pipes with pipe holes of fins so as to easily insert the pipes into the pipe holes. In the apparatus, a send-in section sets the stack pin holders at predetermined positions and is capable of keeping the stack pins extending upward. A plurality of supporting sections vertically hold the pipes whose U-bent sections are located at the uppermost position. A pipe inserting section has a plurality of holders, which are capable of receiving the pipes from the supporting sections to hold, and a plurality of inserting dies for pushing the pipes downward. A guide section is provided above the send-in section and has a plurality of guide holes into which the pipes pushed by the inserting dies are inserted. The guide holes are capable of limiting outer width of the pipes by at least inner faces and introducing the pipes into the pipe holes of the fins.

16 Claims, 20 Drawing Sheets

ASSEMBLING APPARATUS FOR A HEAT EXCHANGER

BACKGROUND OF THE INVENTION

1. Field of the Invention

The present invention relates to an assembling apparatus for a heat exchanger.

2. Description of Background Art

A fin unit of a heat exchanger is shown in FIG. 28. Multiple fins 10 are stacked with predetermined clearances, and U-shaped pipes 11 are inserted through pipe holes 10a of the fins 10. The pipes 11 are expanded to fix the fins 10 thereto. Ends of the pipes 11 are mutually connected by U-shaped connecting pipes (not shown) so as to run heat conductor therethrough.

An assembling apparatus for the heat exchanger is known.

The conventional assembling apparatus has a pipe inserting unit.

Firstly, as shown in FIG. 29, multiple fins 10 are stacked onto a stack pin holder 13 by piercing stack pins 12 therethrough. The stacked fins 10 are laid on a supporting table 14 (see FIG. 30). Next, the pipe 11, which is held by guides 15, is pushed by a pusher 16 to insert the pipe 11 into the pipe holes 10a of the fins 10. Thus, the pipe 11 can be automatically inserted thereinto.

However, the conventional assembling apparatus has the following disadvantages.

The pipe 11 is generally made of copper having a higher thermal conductivity. However, the copper pipe is a bendable metal pipe. When the copper pipe 11, which is longer than one meter, is pushed through the pipe holes 10a of the fins 10, the ends of the copper pipe 11 are apt to be bent downward by gravity. If the ends of the pipe 11 are bent, it is very difficult to align the ends with the pipe holes 10a and the guides 15, so that it is sometimes impossible to insert the pipe 11 therethrough.

The sizes of the fins 10 are not fixed because of manufacturing accuracy. Therefore, when the stacked fins 10 are laid on an upper face of the supporting table 14, the pipe holes 10a of the fins 10 are vertically shifted relative to one another. With this shift, the end or ends of the pipe 11 come into contact with an edge of a pipe hole 10a, so that the insertion is sometimes made impossible, or the pipe holes 10a are sometimes damaged.

And the stacked fins 10, which are laid on the supporting table 14, are apt to transform because the fins 10 are made of an aluminum sheet.

SUMMARY OF THE INVENTION

An object of the invention is to provided an assembling apparatus for a heat exchanger, which is capable of certainly coinciding ends of a pipe with pipe holes of fins and easily inserting the pipe therethrough.

Another object of the invention is to provide an assembling apparatus for a heat exchanger, which is capable of fully and automatically inserting the pipe by properly circulating stack pin holders.

Another object of the invention is to provide an assembling apparatus for a heat exchanger, which is capable of fully and automatically inserting the pipe by automatic pull-out and insertion of the stack pins.

To achieve the above objects, the present invention has the following structure. A plurality of stack pins extend upward from upper faces of a plurality of stack pin holders. The stack pins are capable of piercing through multiple fins, which have been stacked onto the stack pin holders with predetermined clearances and each of which has pipe holes through which U-shaped pipes are pierced. A send-in section in which the stack pin holders are set at predetermined positions and is capable of keeping the stack pins extending upwardly. A plurality of supporting sections vertically hold the pipes having U-bent sections which are located at the uppermost position. A pipe inserting section has a plurality of holding means, which are capable of receiving the pipes from the supporting sections to hold, and a plurality of inserting dies for pushing the pipes downwardly. A guide section is provided above the send-in section and includes a plurality of guide holes into which the pipes pushed by the inserting dies are inserted. The guide holes are capable of limiting the outer width of the pipes by at least inner faces and introducing the pipes into the pipe holes of the fins.

With the above described structure, the U-shaped pipes are vertically supported by the supporting sections in a posture with the U-bent sections disposed upwardly, so that ends of the pipes are not bent by gravity.

The pipes supported by the supporting sections are received by the holding means of the pipe-inserting section, then pushed downwardly by the inserting dies. With the process, the lower ends of the pipes come into the guide holes. The width of the pipes is limited and defined by inner faces of the guide holes. The pipes are further pushed downward into the pipe holes of the stacked fins. At the time, the stacked fins are supported by the stack pins, which are vertically pierced through the fins, so that the fins are capable of moving in the horizontal direction. With this structure, even if the pipe holes are slightly shifted relative to one another, the fins move when the pipes are inserted, so that the pipes can be inserted through the pipe holes without deforming edges thereof.

In the assembling apparatus of the present invention, as described above, the pipes are supported by supporting a posture of the U-bent sections, pushed downwardly by the inserting dies and inserted into the pipe holes of the fins along the guide holes. Thus, the pipes are not affected by gravity. And the pipes are precisely and easily inserted into the pipe holes without bending.

BRIEF DESCRIPTION OR THE DRAWINGS

Embodiments of the present invention will now be described by way of examples and with reference to the accompanying drawings, in which.

Figure 14:
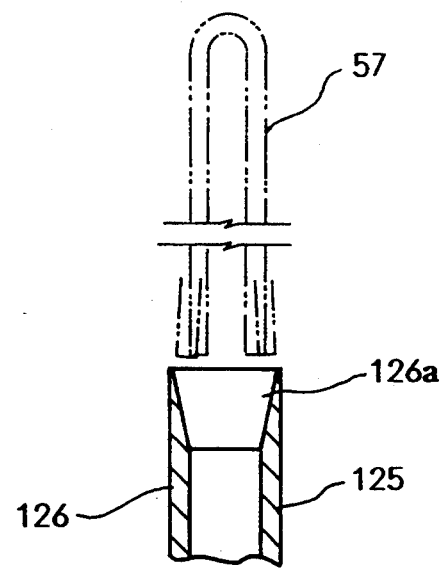
Figure 15:
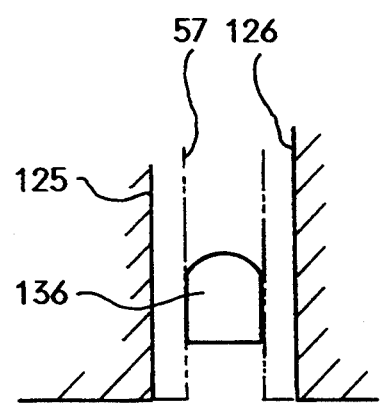
Figure 16:
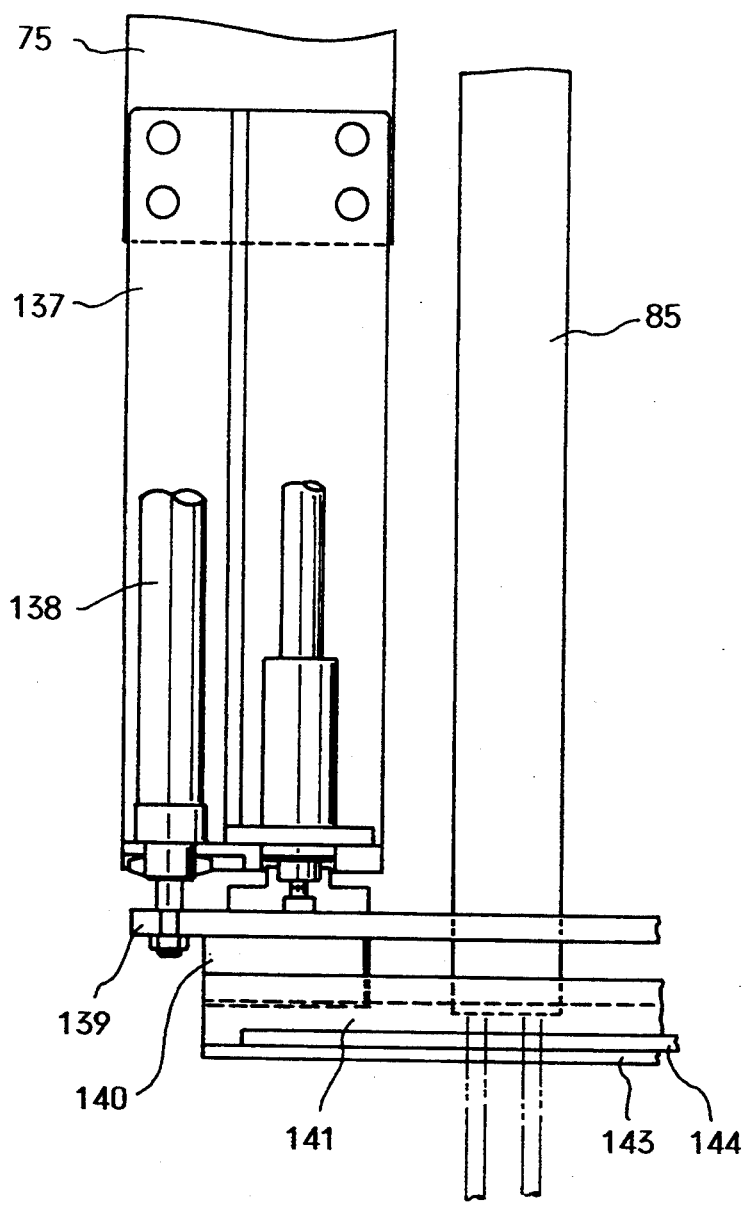
Figure 17:
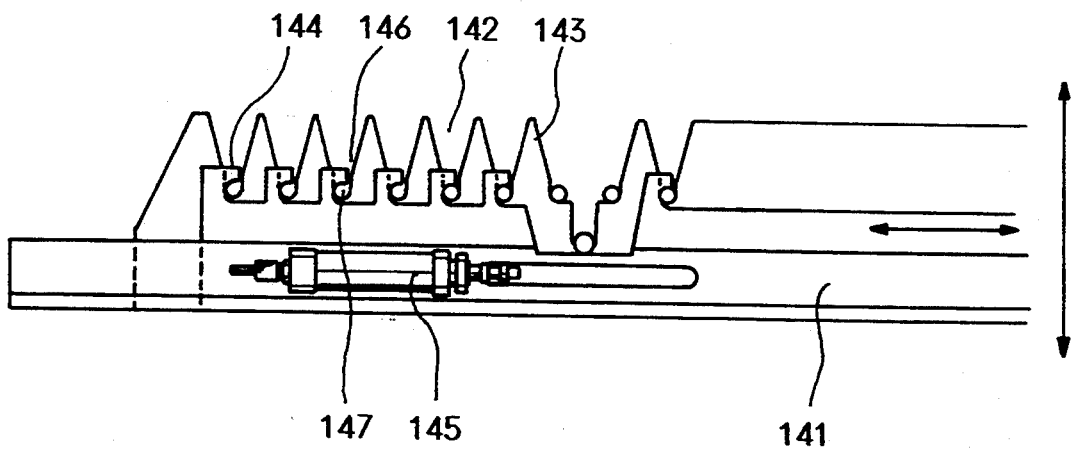
Figure 18:
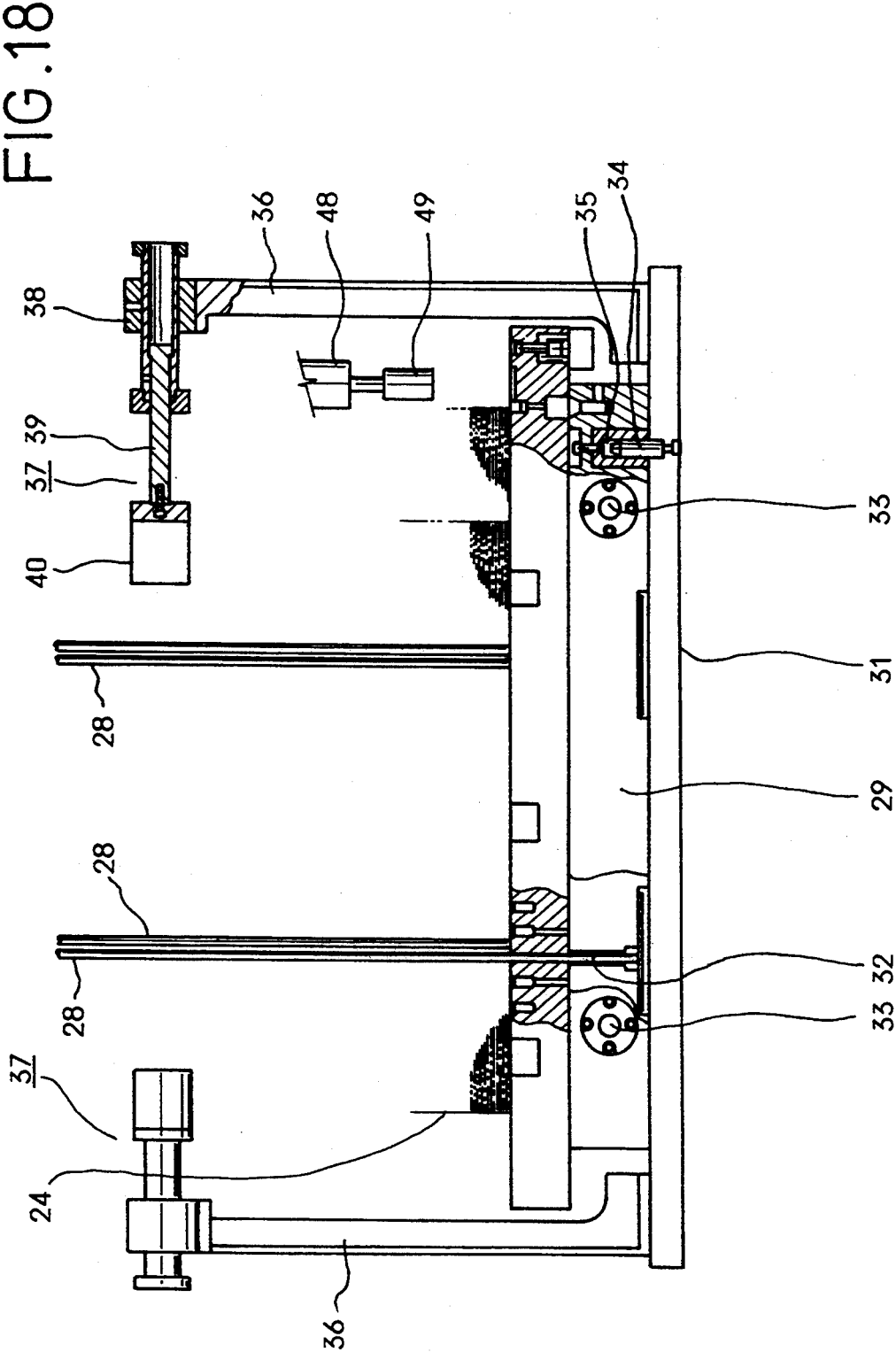
Figure 19:
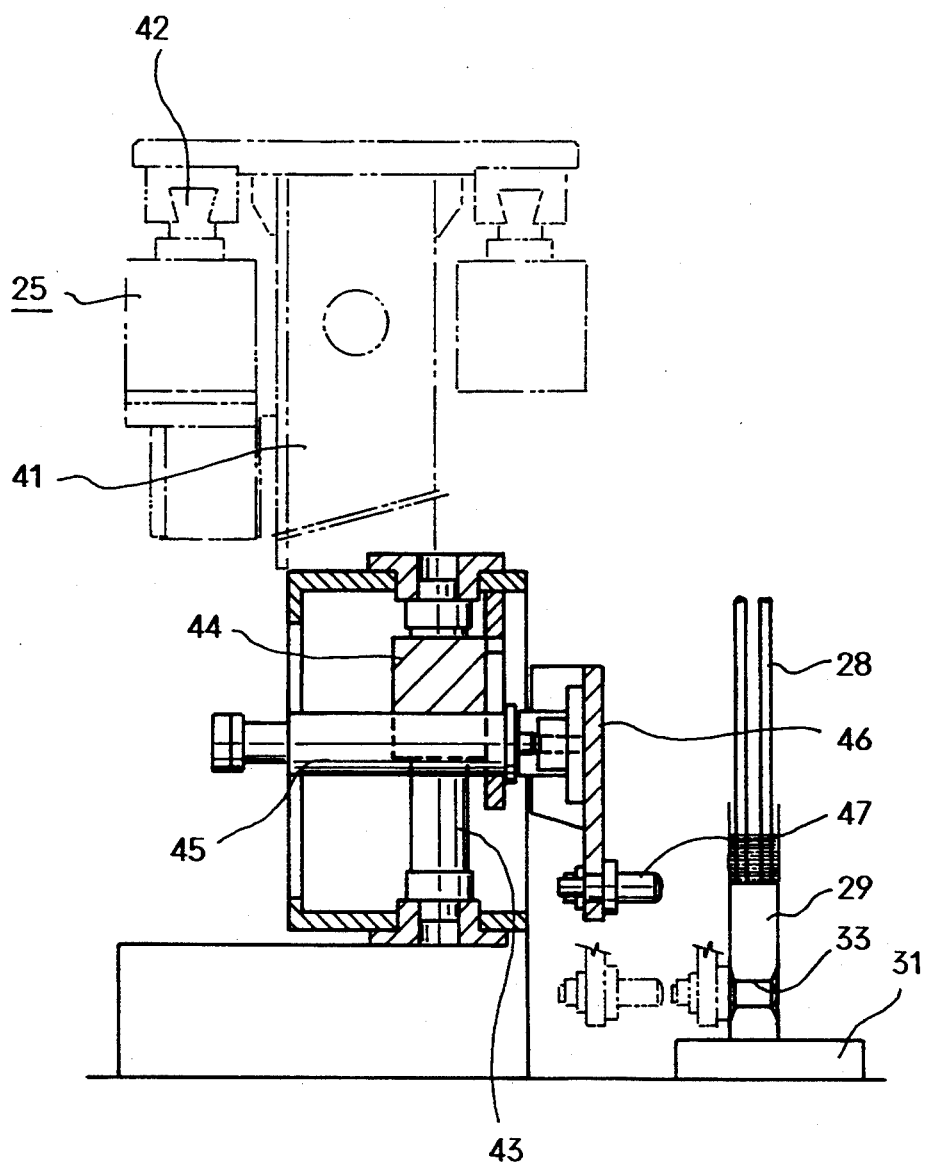
Figure 20:
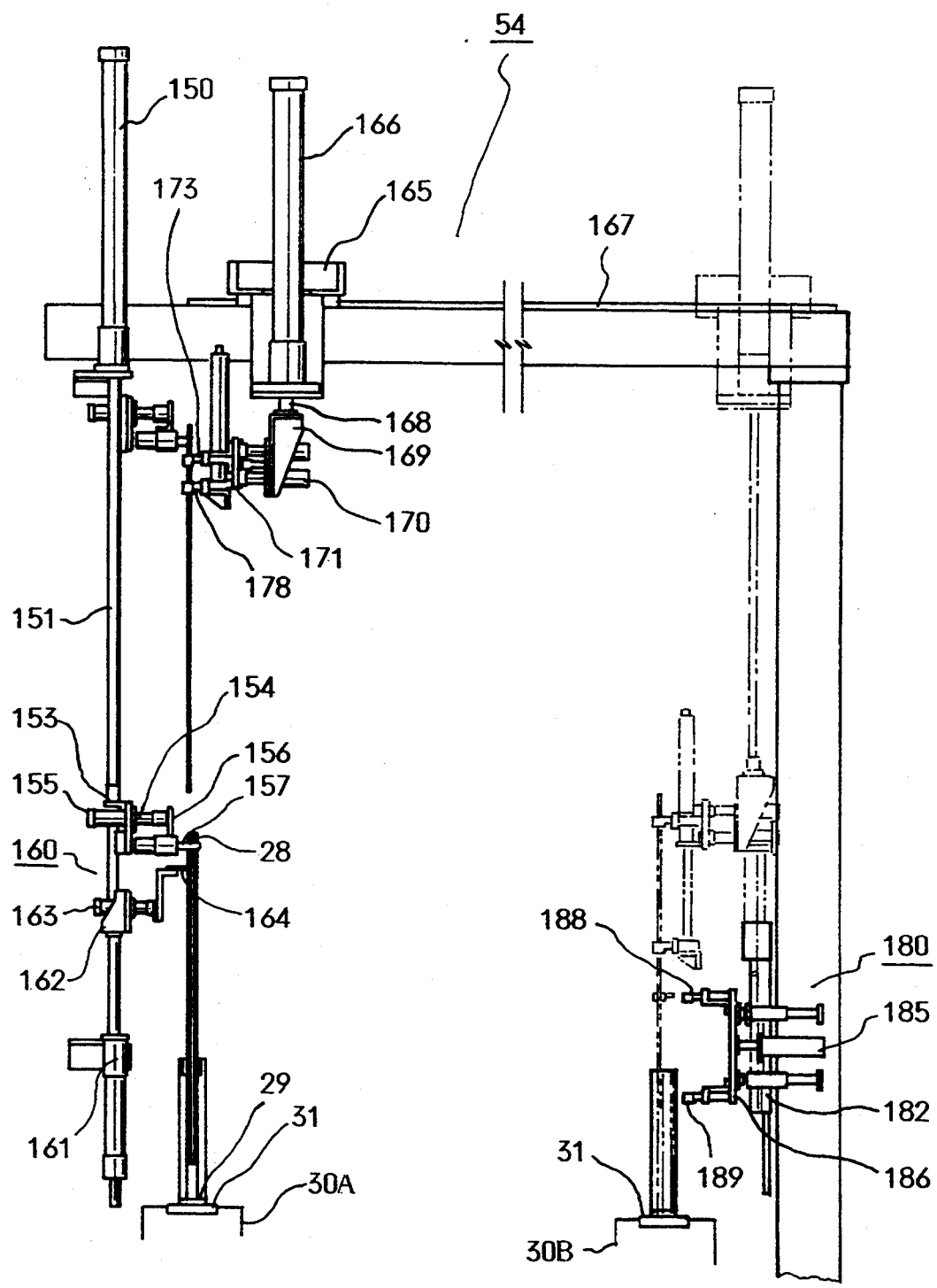
Figure 21:
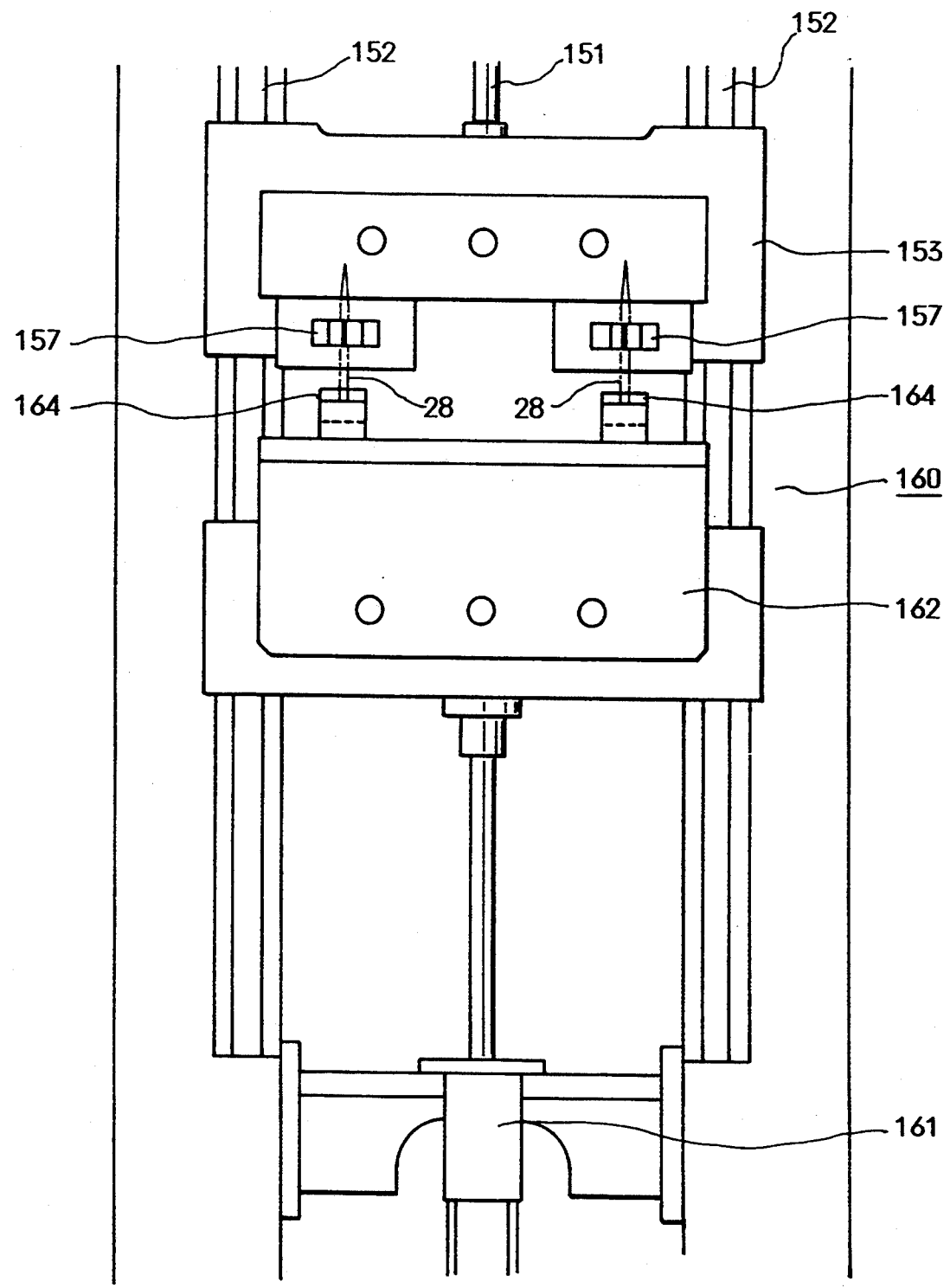
Figure 22:
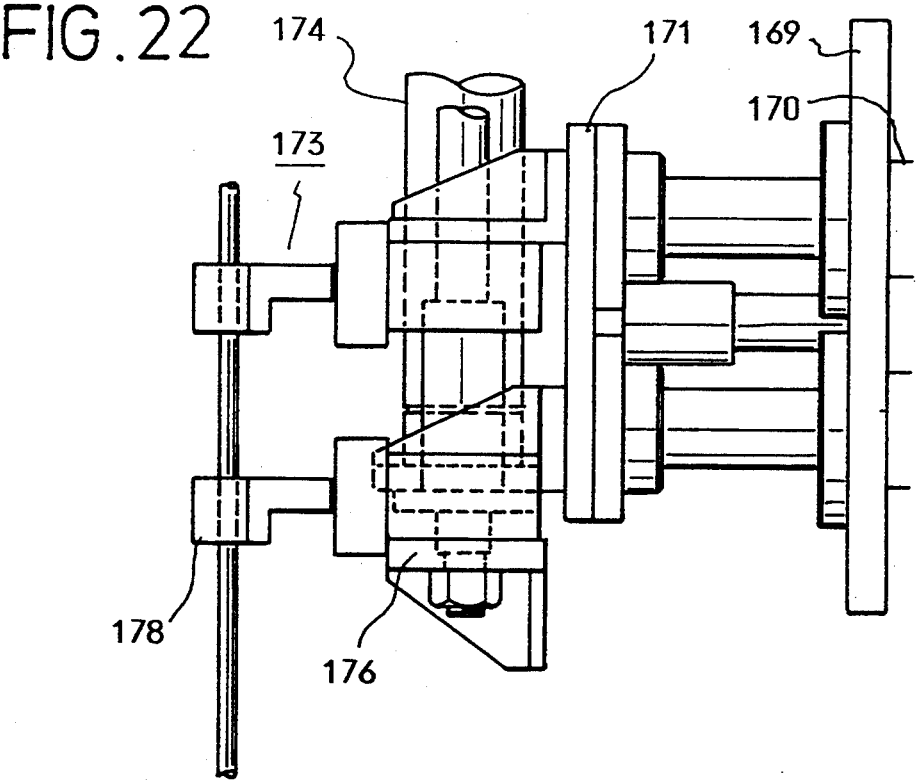
Figure 23:
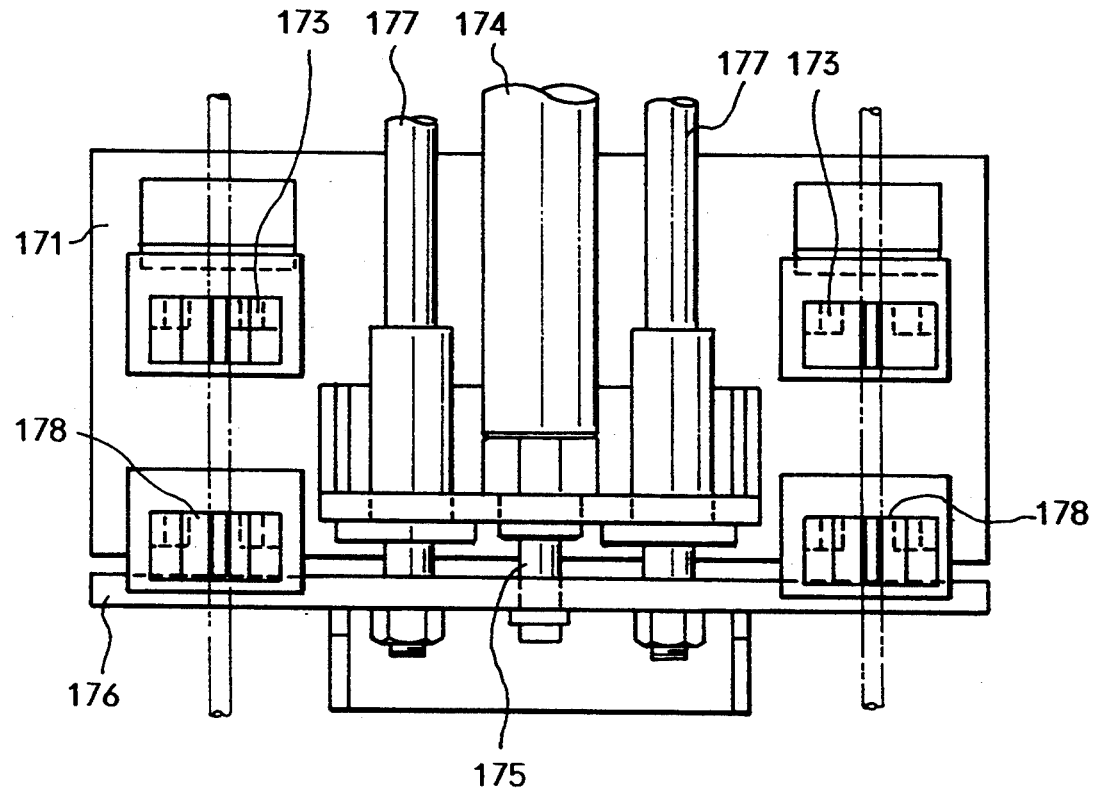
Figure 24:
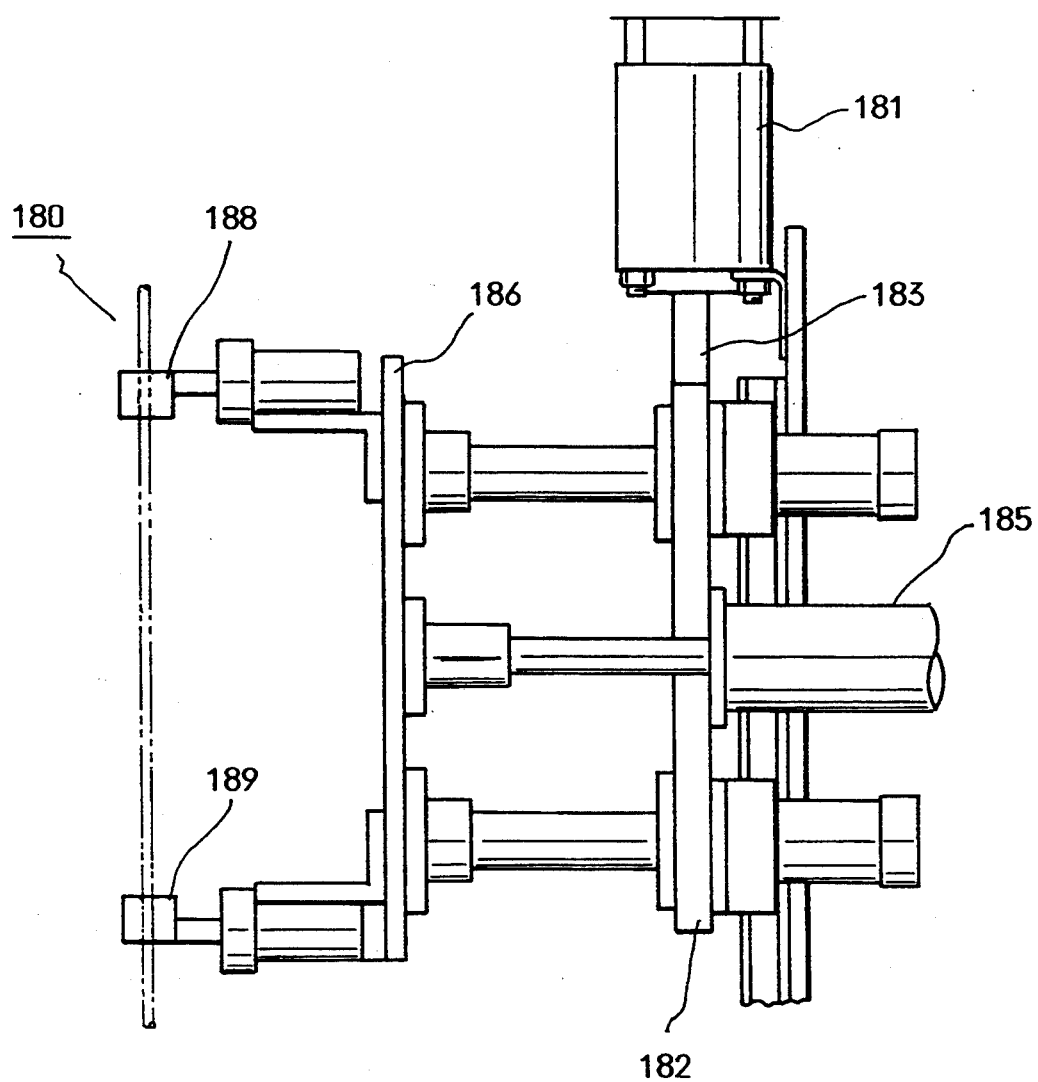
Figure 25:
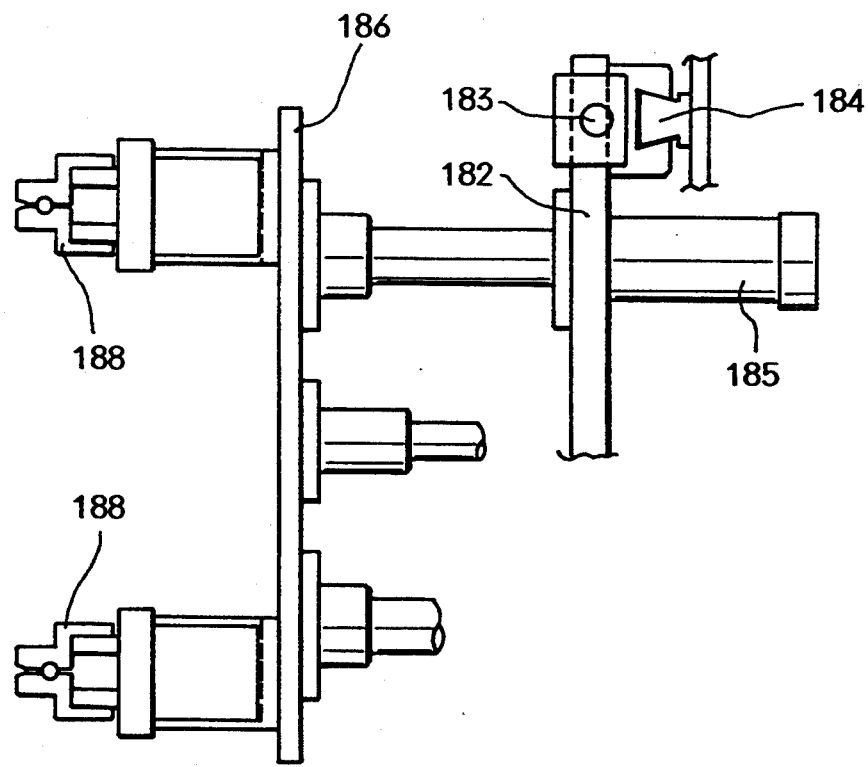
Figure 26:
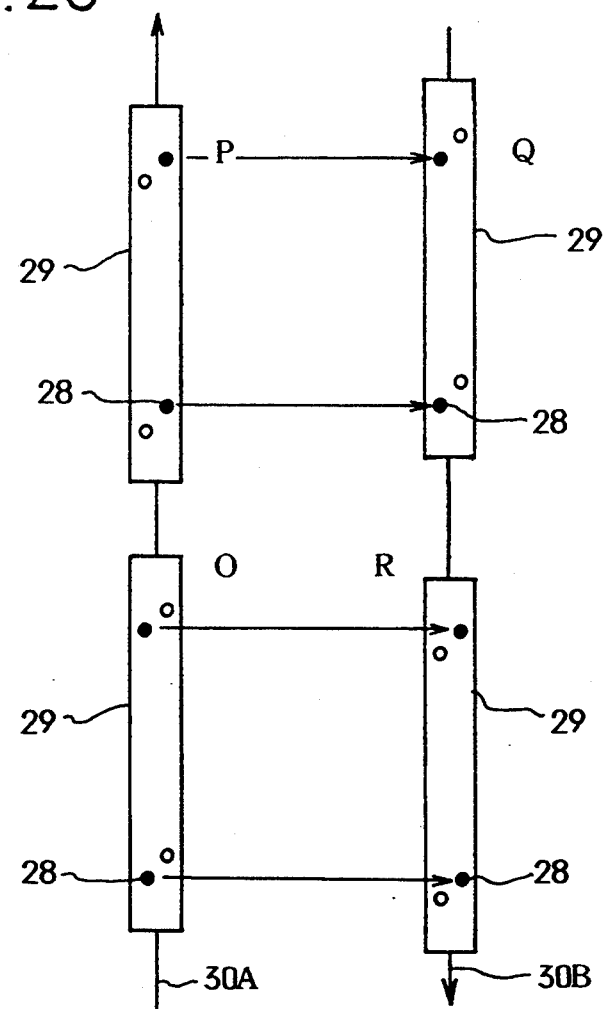
Figure 27:
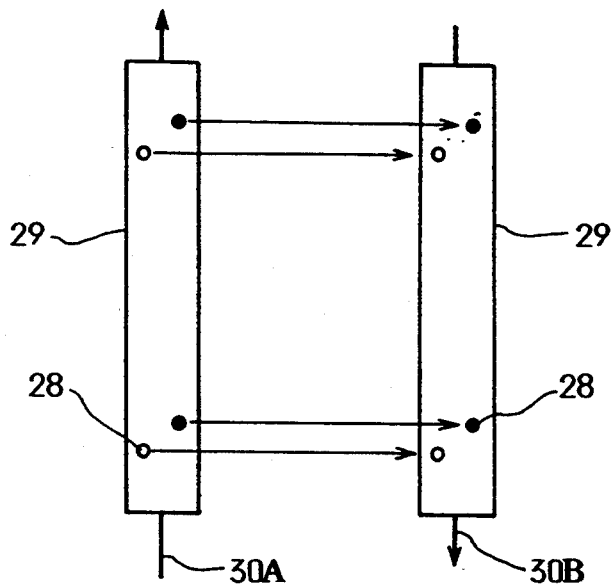
Figure 28:
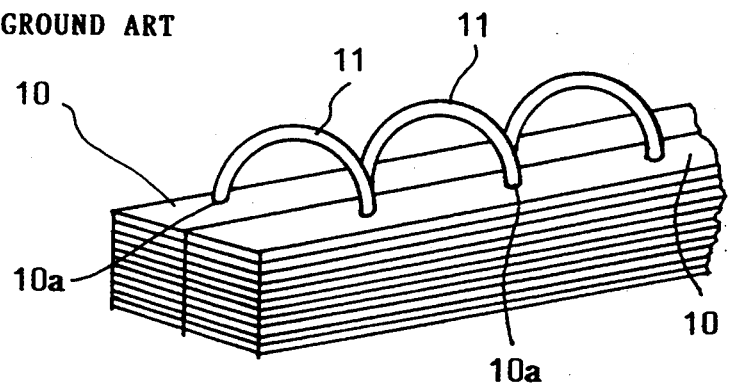
Figure 29:
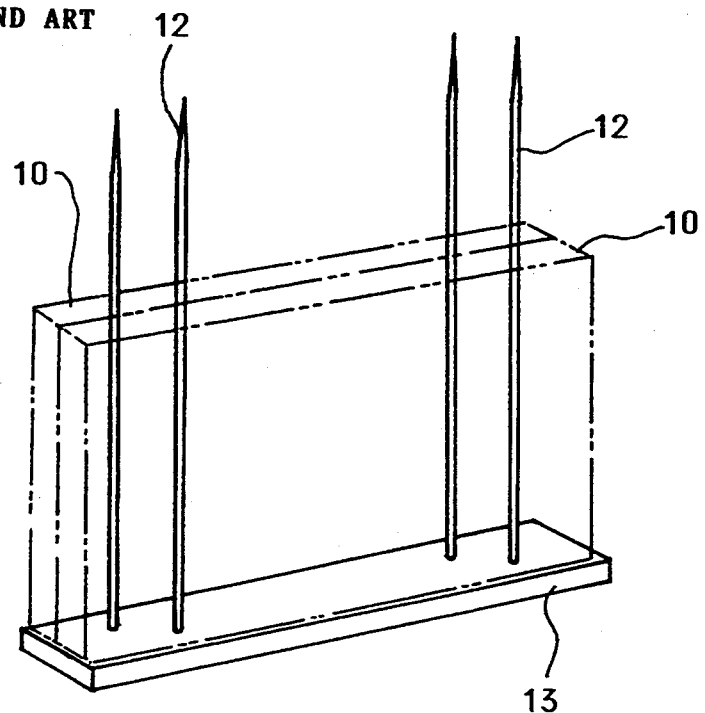
Figure 30:
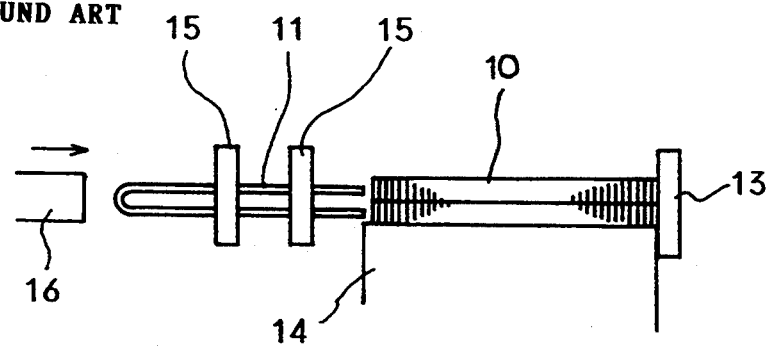

FIG. 14 is a view of a guide hole of a limiting-guide member;
FIG. 15 is a view of a limiting member;
FIG. 16 is a partial front view of a limiting section;
FIG. 17 is a partial plan view of the limiting section;
FIG. 18 is a front view showing a second pallet and stack pin holders;
FIG. 19 is a partial exploded view of a transferring unit;
FIG. 20 is a front view of a pull-insert unit;
FIG. 21 is a partial view of the pull-insert unit;
FIG. 22 is a partial view of the pull-insert unit;
FIG. 23 is a partial view of the pull-insert unit;
FIG. 24 is a front view of an inserting unit;
FIG. 25 is a plan view of the inserting unit;
FIG. 26 is a view showing the process of pulling and inserting the stack pins;
FIG. 27 is a view showing the process of pulling and inserting the stack pins;
FIG. 28 is a view of a heat exchanger (a fin unit);
FIG. 29 is a view of the stacked fins; and
FIG. 30 is a view showing the method of the conventional method of inserting the pipes.

DETAILED DESCRIPTION OF THE PREFERRED EMBODIMENTS

Preferred embodiments of the present invention will now be described in detail with reference to the accompanying drawings.

Figure 1:
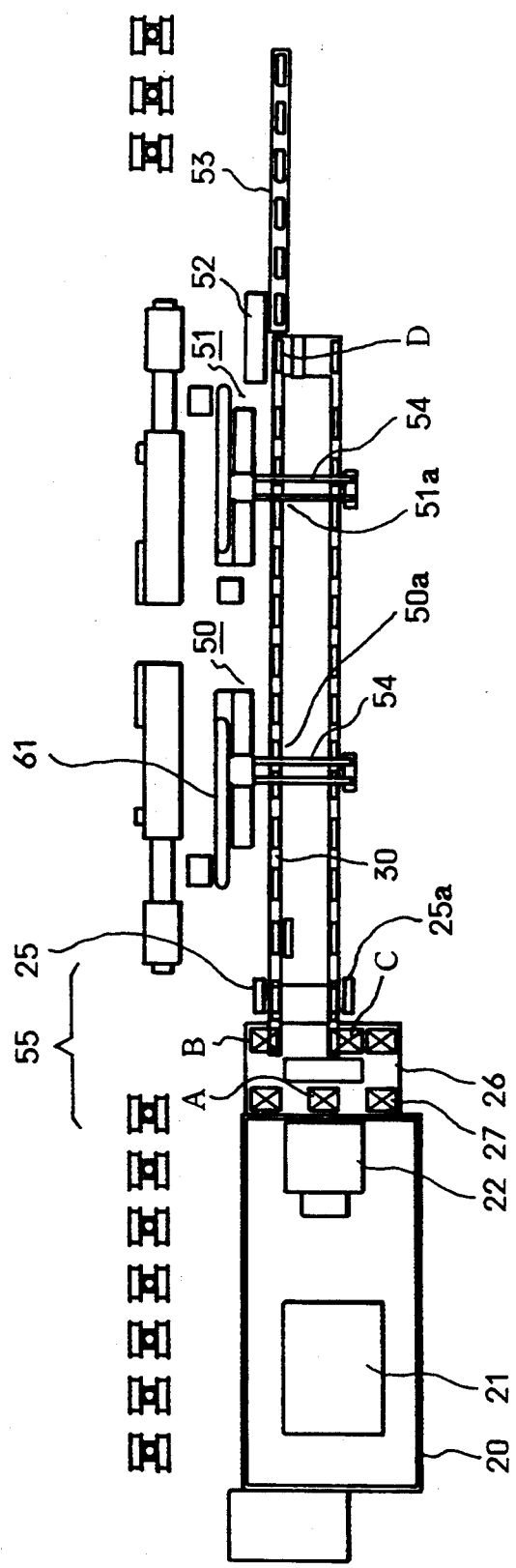
FIG. 1 is a summarized plan view of an assembling line for heat exchangers.

FIG. 1 shows a plan view of an assembling apparatus for heat exchangers (fin units).

In FIG. 1, a fin manufacturing section 20 has a press unit 21 and a remote-cut unit 22.

Figure 2:
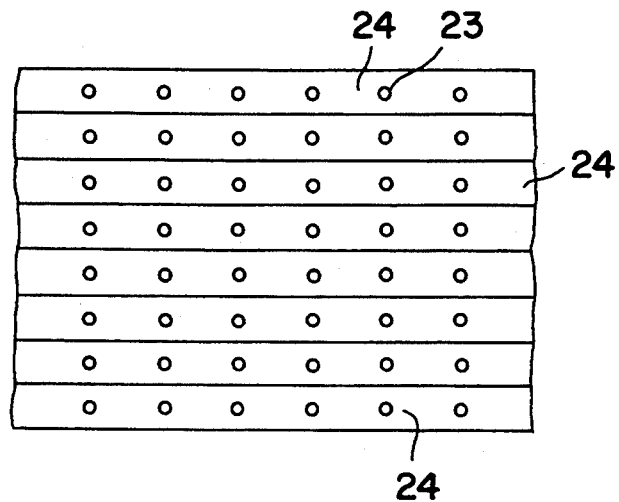
FIG. 2 is a partial plan view of fins.

In the press unit 21, an aluminum sheet, which has been rolled, is continuously pulled out and pressed to make fins 24, which have pipe holes 23, arranged in a plurality of rows (see FIG. 2).

In the remote-cut unit 22, the fins 24 which have been arranged in a plurality of rows are cut to be separate rows and each row of the fins 24 is cut to a predetermined length.

Figure 3:
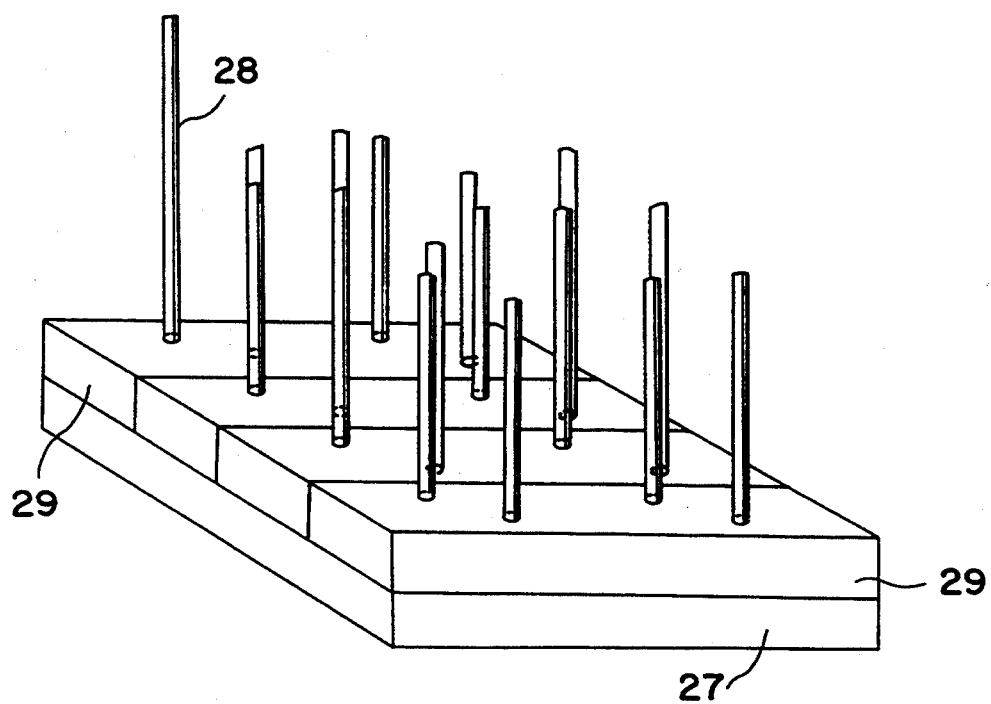
FIG. 3 is a perspective view of stack pin holders on a first pallet.

First pallets 27 are circulated on a circulating way 26. Stack pin holders 29, each including stack pins 28 extending upwardly at predetermined positions, are held on each first pallet 27 (see FIG. 3).

At position A of the circulating way 26, the stack pins 28 are pierced through the pipe holes 23 of the fins 24, which have been cut by the remote-cut unit 22 with a predetermined length, so that the fins 24 are stacked on an upper face of the stack pin holders 29. On each stack pin holder 29, the stacked fins 24 are arranged in two rows.

At a position B (a first transferring position) of the circulating way 26, the stack pin holders 29 on the first pallets 28 are transferred to second pallets 31 (see FIG. 18), which are circulated by a circulating conveyor 30 (a pallet-circulating way), one by one, by a first transferring unit 25.

The second pallets 31 to which the stack pin holders 29 have been transferred are circulated by the circulating conveyor 30. While the second pallets 31 are circulated, the following steps are executed.

Firstly, the pipes are pierced through the fins 24. The fin unit in which the pipes have been pierced are taken out from the stack pin holders 29. At the position B, the vacant stack pin holders 29 are transferred to the first pallets 27, from which the stack pin holders 29 have been transferred to the second pallets 31 on the circulating conveyor 30 at the position B and which have been moved to a position C (a fifth transferring position), from the corresponding second pallets 31 on the circulating conveyor 30 by a second transferring unit 25a whose structure is the same as that of the first transferring unit 25. Then the first pallets 27 to which the stack pin holders 29 are transferred are returned to the position A one by one. With this structure, the first pallets 27 and the stack pin holders 29 are circulated to continue the operation.

In FIG. 1, pipe-inserting units 50 and 51 are arranged along side the circulating conveyor 30. The reason will be explained as follows: Some pipes are inserted into some pipe holes 23 of the fins 24 by the pipe-inserting unit 50. Next, the stack pins 28 are pulled out from the stack pin holders 29 by pull-insert units 54, which is provided in the vicinity of the pipe-inserting unit 50. Even if the stack pins 28 are pulled out, the fins 24 are supported on the stack pin holders 29 by the pipes. Afterwards the rest of the pipes are inserted into the rest of the pipe holes 23, which include the pipe holes 23 from which the stack pins 28 have been pulled out. Note that, to insert the pipe easier, for example, preferable the diameter of the pipe holes 23 is about 7.3 mm and that of the stack pins 28 is about 7.1 mm in the case where the diameter of the pipe to be inserted is 7.0 mm.

The fin units assembled are taken onto a conveyor 53 at a position C, which is a final position on the outward way of the circulating conveyor 30, by a turning unit 52. The fin units, which have been taken onto the conveyor 53, are conveyed to a tube expander, whose structures have been known, to expand the pipes and fix the fins 24 thereon.

At the position D, the fin units are taken, and the vacant stack pin holders 29 are conveyed on the return way of the circulating conveyor 30. While moving on the return way of circulating conveyor 30, the stack pins 28, which have been pulled out, are inserted into the stack pin holders 29 on the return way by pull-insert units 54. Then the stack pin holders 29 are transferred to the first pallets 27 at the position C (the fifth transferring position) from a final position of the return way. Note that, in the case where fin units in which the pipes are not inserted into the pipe holes through which the stack pins 28 are inserted, one pipe-inserting unit will do.

Successively, parts of the apparatus will be described in detail.

Firstly, the transferring unit 25, the stack pin holder 29 and the second pallet 31 will be explained.

As clearly shown in FIG. 18, the stack pin holder 29 has insert-holes 32 into which the stack pins 28 are inserted. There are bored two support holes 33, into which finger pins of the first and second transferring units 25 and 25a are inserted, on a front face of the stack pin holder 29. Two positioning holes 35 are provided (one of the two is shown), into which a of pins 34 (one of the two is shown) projecting from the upper face of the second pallet 31 is inserted and bored in a bottom face of the stack pin holder 29. Therefore, the stack pin holder 29 is transferred onto the circulating conveyor 31 to insert the pins 34 into the positioning holes 35, so that the stack pin holders 29 is located at that position and supported by the pins 34.

Note that, the first pallet 27 also has pins (not shown), which are capable of being inserted into the positioning holes 35. The stack pin holder 49 is held above and parallel to the first pallet 27 by inserting said pins in the positioning holes 35.

There are provided supporting walls 36 at both ends of the second pallet 31. There are provided holding sections 37, which are capable of clipping the stacked fins 24 to be held at each upper section of the supporting walls 36.

Each holding section 37 has a rod 39, which is slidable in the horizontal direction, and a holding member 40, which is formed into a forked shape and provided at the front end of the rod 39. The rods 39 are guided and held at proper positions by guides 38. Therefore, the fins 24 can be held by transferring the stack pin holders 29, on which the fins 24 are stacked, onto the second pallets 31, pressing the rods 39 to move the holding members 40 inward, and clipping the both faces of the stacked fins 24. Note that, the rods 39 may be automatically moved by adopting proper means, such as a cylinder unit.

In FIG. 19, the first transferring unit 25 is provided to correspond to a position B (a fourth transferring position) of the circulating way 26. The first transferring unit 25 transfers the stack pin holders 29 from the first pallets 27, which is located at the position B, to the second pallets 31, one by one.

A moving body 41 is capable of moving in the horizontal direction between a side of the first pallets 27 at the position B and the circulating conveyor 30 corresponding to the position B. The moving body 41 is guided by rails 42 and driven by a mechanism including a motor and a screw rod (not shown).

There is provided an elevating body 44, which is capable of moving in the vertical direction and guided by a shaft 43, at a lower section of the moving body 41. The elevating body 44 is driven by a mechanism (not shown), which also includes a motor and a screw rod.

The elevating body has a cylinder unit 25, whose rod is capable of extending and retracting in the direction perpendicular to the moving directions of the moving body 41 and the elevating body 44. There is attached a fixed plate 46 at the end of the rod of the cylinder unit 45. There are provided two finger pins 47, which are capable of being inserted into the support-holes 33 o the stack pin holders 29, at the lower section of the fixed plate 46.

An L-shaped arm 48 extends forward from the moving body 41 (see FIG. 18). There is provided a pressing section 49 at a lower end of the arm 48. The pressing section 49 is capable of pressing an upper face of the stack pin holders 29 lifted upwardly. The arm 48 has a spring (not shown) for exerting the pressing section 49, so the pressing section 49 is capable of slightly moving toward the arm 48.

Furthermore, another L-shaped arm (not shown), similar to the arm 48, extends from the moving body 41, and there is provided another cylinder unit (not shown), which is capable of pressing the stacked fins 24 when the stack pin holders 29 are lifted upwardly, to said another arm.

Next, the action o transferring the stack pin holders 29 from the first pallets 27 at the position B to the second pallets 31 will be explained.

Firstly, the moving body 41 is driven to move the finger pins 47 to the position at which the finger pins 47 face the stack pin holder 29 to be transferred, which is held on the first pallet 27 at the position B. Next, the cylinder unit 45 is driven to move the finger pins 47 forward for insertion into the support-holes 33. Then the elevating body 44 is moved upward, so that the stack pin holder 29 on the first pallet 27 is lifted by the finger pins 47 and detached therefrom. At that time, the upper face of the stack pin holder 29 is pressed by the pressing 49, and the fins 24 are also pressed by the cylinder unit (not shown), so that the stack pin holder 29 and the stacked fins 24 are stably held and integrally lifted by the finger pins When the stack pin holder 29 and the stacked fins 24 are lifted, the rod of-the cylinder unit 45 is retracted, and the moving body 41 is moved to face a front face of the second pallet 31 located at the position B on the circulating conveyor 30. Next, the rod of the cylinder unit 45 is extended to move the stack pin holder 29 to a position above the second pallet 31. Then the elevating body 44 retracted, so that the pins 34 are inserted into the positioning holes 35 of the stack pin holder 29. Next, the rod of the cylinder unit 45 is retracted to have the finger pins 47 pull out from the support-holes 33, so that the stack pin holder 29 is transferred from the first pallet 27 to the second pallet 31.

After the stack pin holder 29 is transferred onto the second pallet 31, the holding members 40 are pushed to move forward so as to support both sides of the stacked fins 24, so that the stacked fins 24 are conveyed on the circulating conveyor 30 without laying together with the second pallet 31.

Successively, the pipe-inserting units 50 and 51 will be explained. Note that, both units 50 and 51 have the same structure, so only the unit 50 will be explained.

Figure 4:
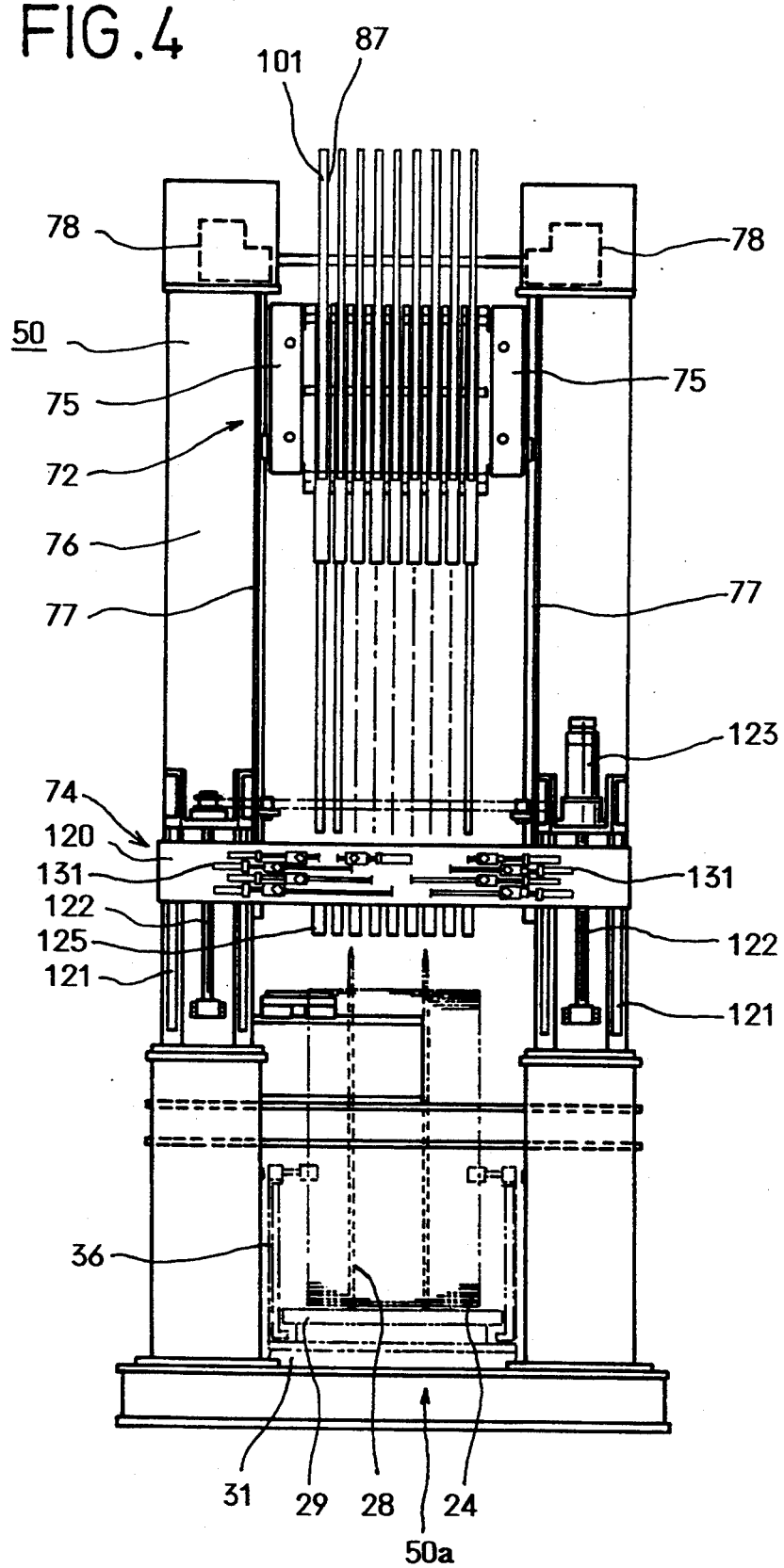
FIG. 4 is a front view of a pipe-inserting unit.
Figure 5:
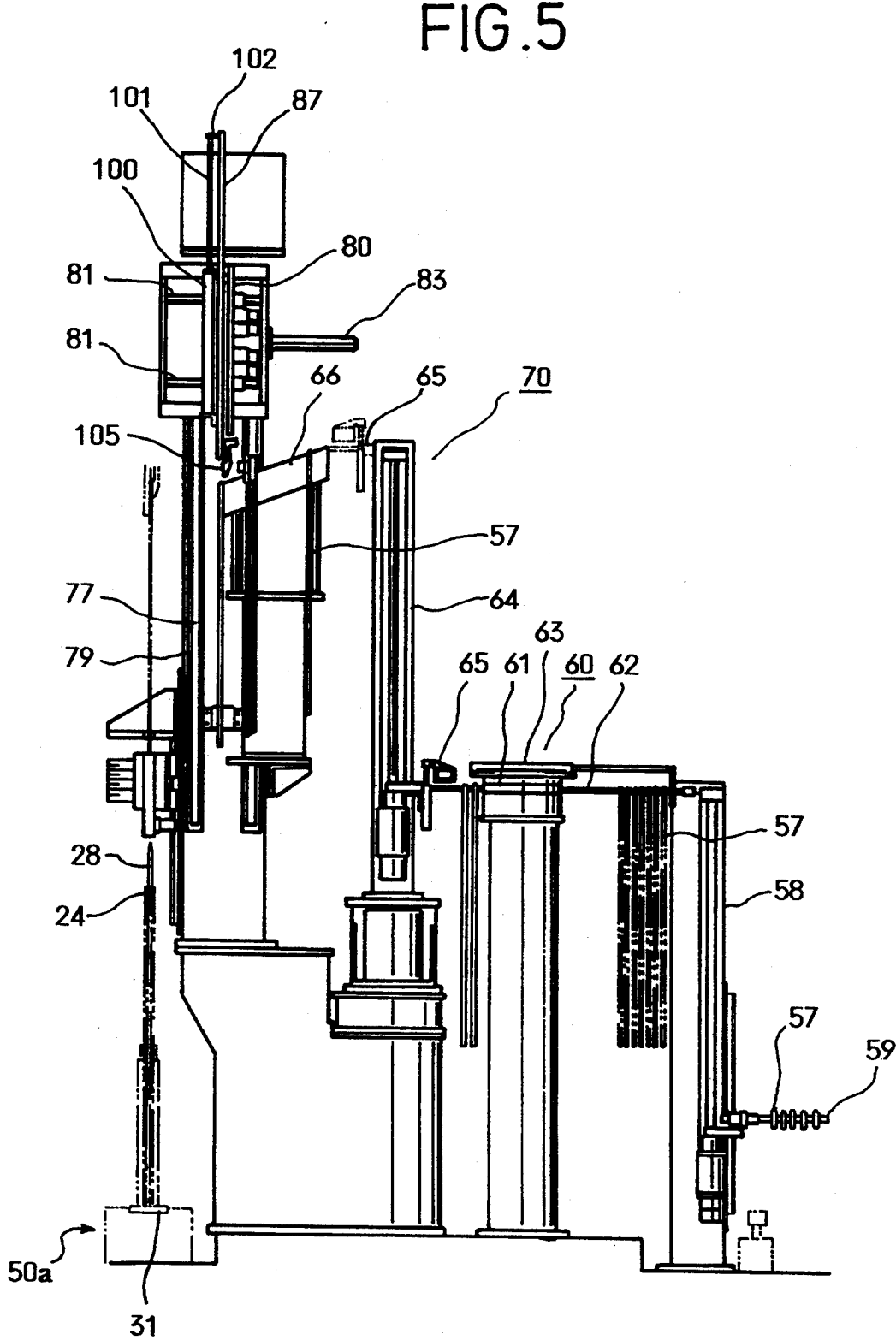
FIG. 5 is a side view of the pipe-inserting unit.
Figure 6:
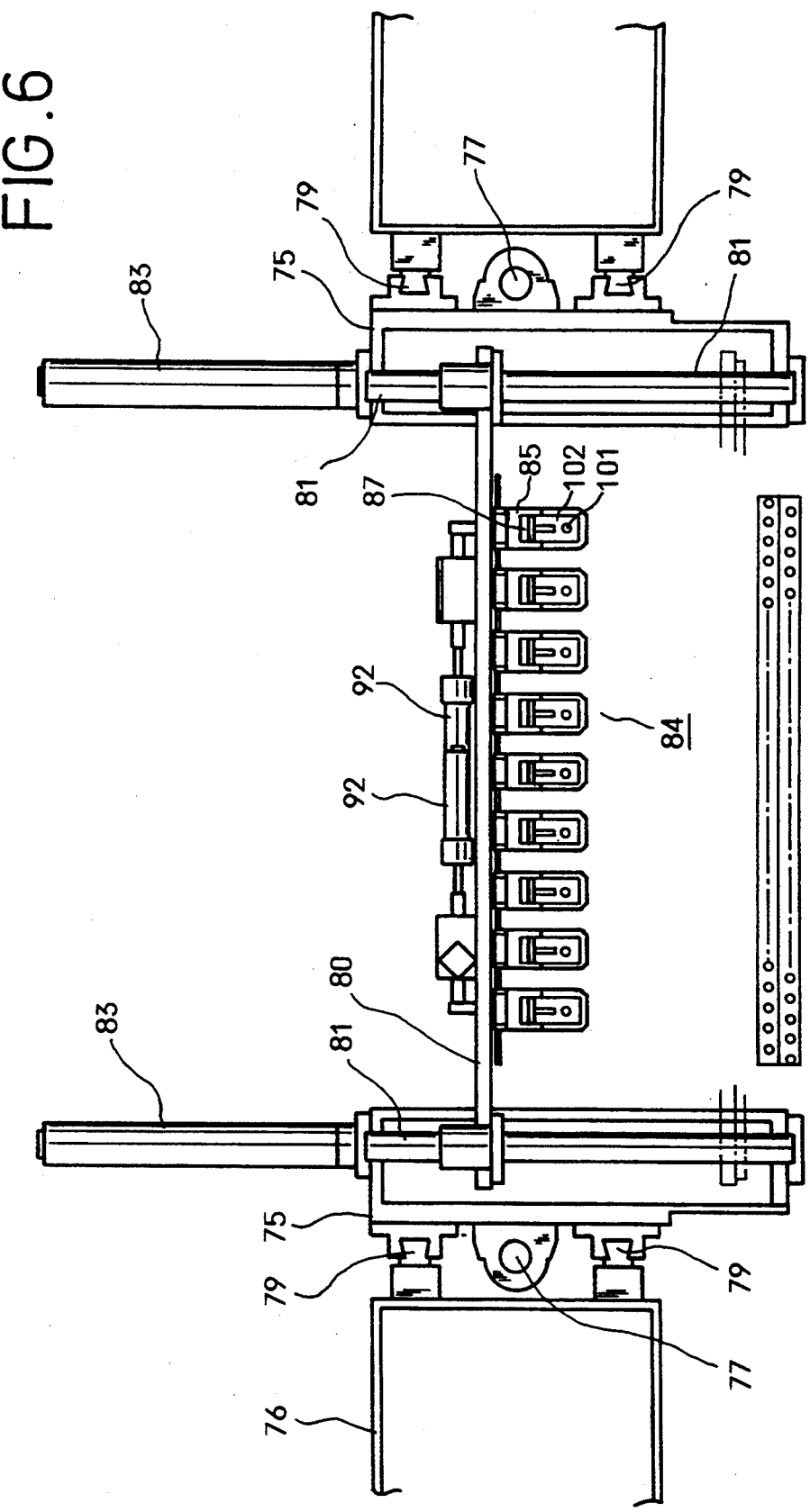
FIG. 6 is a plan view of the pipe-inserting unit.

FIG. 4 is a front view, FIG. 5 is a side view and FIG. 6 is a plan view of the pipe-inserting unit 50.

The stack pin holder 29, on which the fins 24 are stacked and which has been transferred onto the second pallet 31 of the circulating conveyor 30, is conveyed to the position in front of the pipe-inserting unit 50 by the circulating conveyor 30, and stopped at the position for stand-by. The position is a send-in section 50a. And the position in front of the pipe-inserting unit 51 at which the stack pin holder 29 is stopped is a send-in section 51a.

The pipe-inserting units 50 and 51 respectively have pipe-supplying units 70, pipe-inserting sections 72 and guide sections 74.

The pipe-supplying section 70 will be explained.

A pipe-bending unit for bending a pipe into a U-shape and cutting it with a predetermined length has been already known. A pipe bending line 55, which includes the pipe-bending unit, is shown in FIG. 1.

Pipes 57, which have been bent by the pipe bending line 55, are transferred onto a rod 59 of a lift unit 58 (see FIG. 5) in the pipe-supplying section 70 so as to hold.

When the lift unit 58 is driven and the rod 59 is lifted upward, the pipes 57 straddle on the rod 59 at the U-bent sections, and are vertically supported thereby. Upon reaching the uppermost position, the rod 59 turns in 180degrees in a horizontal plane head for a distributing unit 60 (see FIG. 5). The distributing unit 60 has a conveyor 61, which runs in a horizontal plane with an elliptical track. The conveyor 61 has multiple rods 62, which horizontally projected outwardly. The conveyor 61 is stopped when the rod 59 corresponds to the rod 62, then a cylinder unit 63 is driven to transfer the pipes 57 from the rod 59 onto the rod 62. Thus, a predetermined number of the pipes 57 are transferred onto each rod 62 of the distributing unit 60.

Lift units 64 are provided on the opposite side of the lift unit 58 with respect to the distributing unit 60: on the rear side of the pipe-inserting unit 50. The pipes 57 are transferred from the rods 62 of the distributing unit 60 to rods 65 of the lift units 64 by a mechanism similar to the above described mechanism. The rods 65, which have received the pipes 57, are lifted upward, turned in 180 degrees, and transferred onto corresponding shooters 66 (an example of the supporting sections). In this embodiment, nine shooters 66 are provided.

Each shooter 66 is diagonally attached as shown. The pipes 57 are supplied to the lower end section of the shooters 66 one by one, by two cylinder units 67 and 68, which are provided on a side of the shooters 66 (see FIG. 11).

Namely, a stopper provided at a front end of a rod of the cylinder unit 67 contacts the pipe 57, which is a second pipe from the lowest pipe 57, on the shooter 66 to hold. On the other hand, a stopper provided at a front end of a rod of the cylinder unit 68 contacts the lowest pipe 57. The lowest pipe 57 is inserted into the fins 24 by a pipe-inserting section 72. Next, the cylinder unit 68 releases the pipe 57. Thus, the lowest pipe 57 can be introduced to the lowest position of the shooter 66 one by one.

Figure 11:
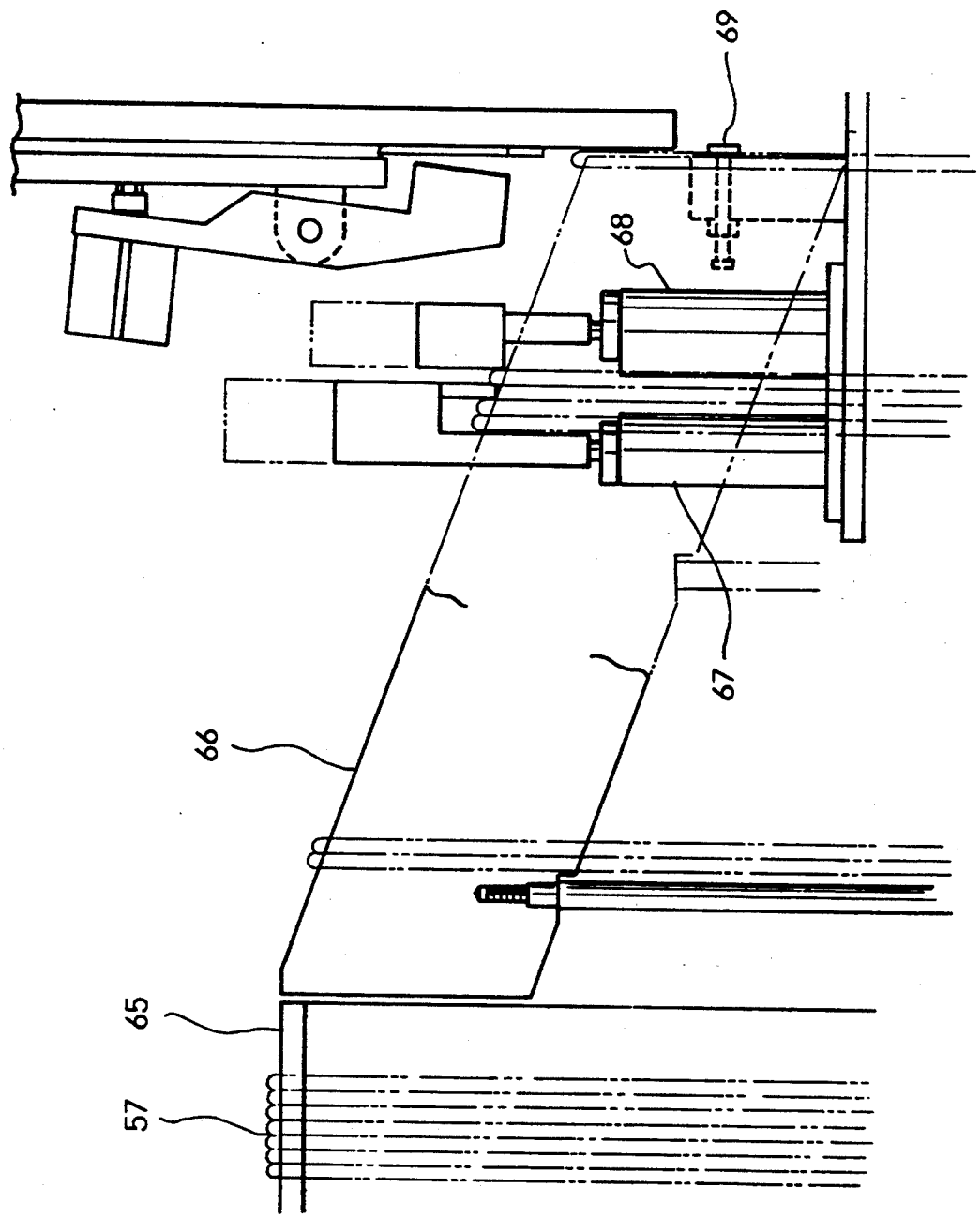
FIG. 11 is a view of a shooter (a supporting section)

There is provided a sensor 69 at the lowest position of each shooter 66 (see FIG. 11). The sensor 69 has two electric conductive sections and a non-electric conductive section, which is provided between the electric conductive sections. When the pipe 57 is introduced to the lowest position of the shooter 66, the electric conductive sections are electrically connected by the pipe 57, so that the sensor 69 detects that the pipe 57 exists at the lowest position of the shooter 66.

Next, the pipe-inserting section 72 will be explained.

Two screw rods 77, which are vertically provided to a base 76, are screwed into both sides of movable boards 75. The movable boards 75 are moved in the vertical direction by rotating the screw rods 77, which are driven by motors 78. The movable boards 75 are moved along the guide rails 79 (see FIG. 6).

As shown in FIG. 6, movable plates 80 are spanned between the movable boards 75. The movable plates 80 are slidably attached to slide rods 81, which are provided in each movable board 75, so that the movable plates 80 are capable of moving in a back-and-forth direction along the slide rods 81. Note that, both end sections of each movable plate 80 are inserted in through-holes, which are board in the movable boards 75, to move in said direction.

There are provided two cylinder units 83 to the movable boards 75. Each rod of the cylinder units 83 is connected to the movable plates 80 so as to move them.

Figure 7:
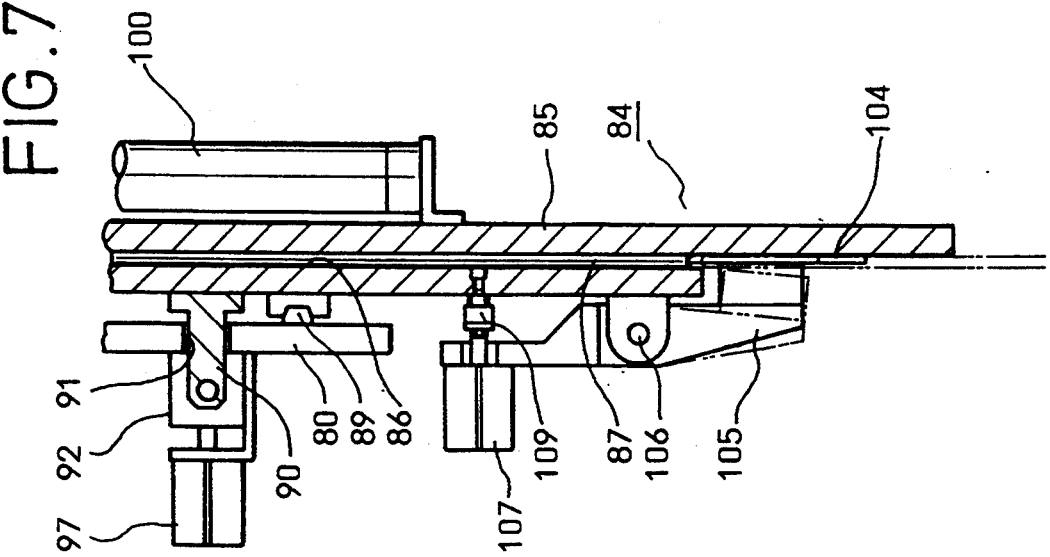
FIG. 7 is a partial side view of an inserting die unit.
Figure 8:
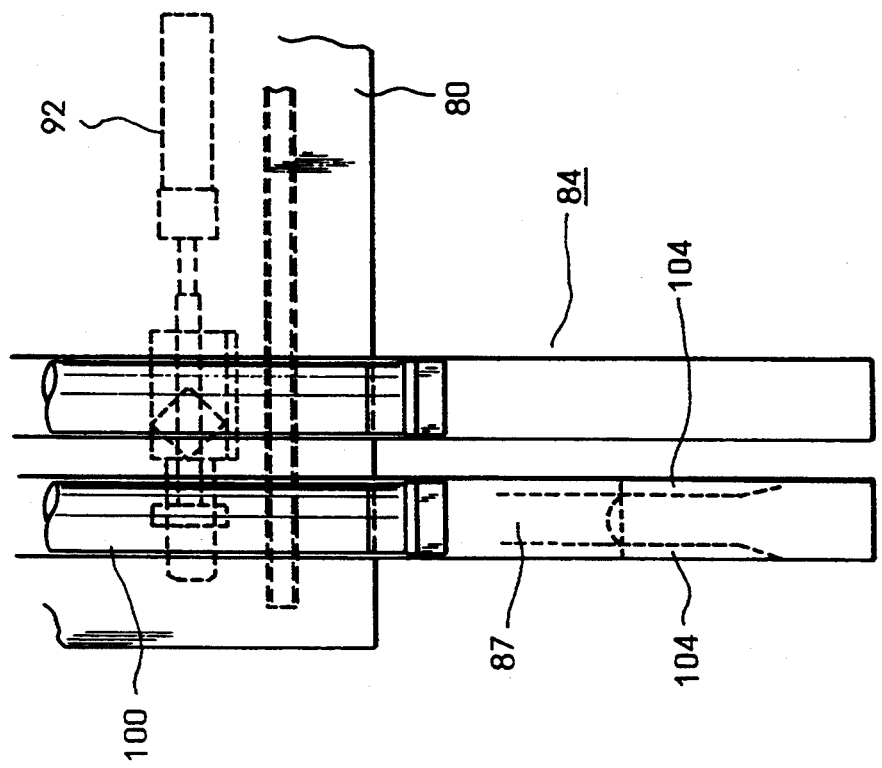
FIG. 8 is a partial front view of the inserting die unit.

There are nine inserting die unit 84 on the front side of the movable plates 80 (see FIGS. 6, 7 and 8).

Attaching members 85 have die slide holes 86, which are bored in the vertical direction, and in which inserting dies are slidably inserted and movable in the vertical direction.

Figure 9:
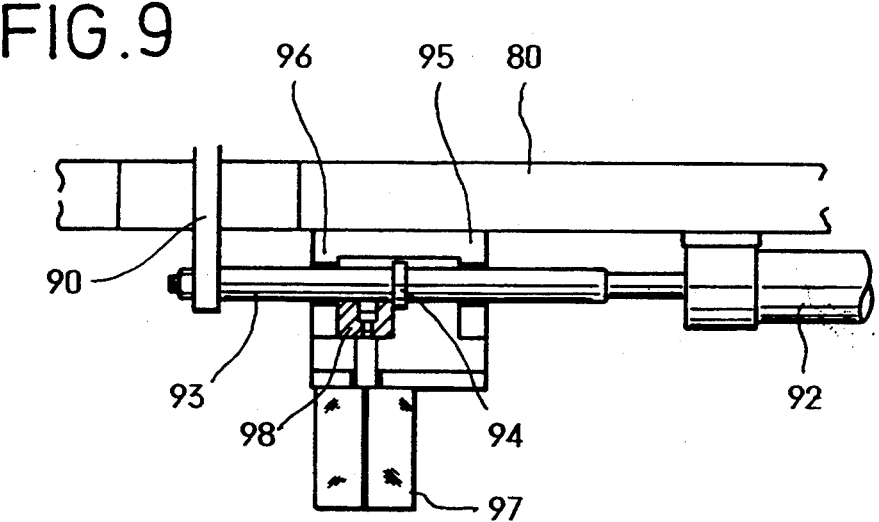
FIG. 9 is a view of a position adjusting means.

The attaching members 85 are capable of moving in the transverse direction along a guide 89, which is provided in front of the front face of the movable plate 80 (see FIG. 7). Fixed pins 90, which project from the rear face of the attaching members 85, are capable of slidably fitting into opening sections 91 of the movable plates 80. Front ends of the fixed pins 90 project toward the rear faces of the movable plates 80. Each rod 93 of the cylinder units 92, which are fixed on the rear faces of the movable plates 80, is connected to each front end of the fixed pins 90 (see FIG. 9).

A contact plate 94 is fixed to a mid section of each rod 93, and is capable of contacting stopper plates 95 and 96, which are provided to the movable plates 80. With this structure, the moving range of the rods 93 and the inserting die unit 84 is defined.

Cylinder units 97 are capable of sending stoppers 98, which are provided at each rod of the cylinder units 97, between the stopper plate 96 and the contact plate 94, so that the rods 93 can be stopped in the midway of said moving range. Therefore, the inserting die unit 84 is capable of stopping at three positions, which are arranged in the transverse direction.

The cylinder units 92 for positioning, the cylinder units 97 for stopping, etc. constitute position adjusting means. But the position adjusting means is not limited to said constitution.

Cylinder unit 100 are respectively provided in the vertical direction and fixed on the front faces of the attaching members 85. Upper ends of rods 101 of the cylinder units 100 are connected to the inserting dies 87 by connected plates 102 (see FIG. 5). Thus, the inserting dies 87 are moved in the vertical direction when the rods 101 are extended and retracted by the cylinder units 100.

As clearly shown in FIGS. 7 and 8, rear lower sections of the attaching members 85 are shortened, so that rear sections of the die slide holes 86 are opened. On both sides of each opened section, there are provided limiting guides 104 whose inner faces are mutually faced and their lower parts are formed into tapered faces. Furthermore, lower end faces of the inserting dies 87 are formed into curved faces, which correspond to the U-bent sections of the pipes to be inserted (see FIG. 8).

In FIG. 7, chucks 105 are respectively provided to lower rear faces of each attaching member 85. The chucks 105 are capable of rotating on axes 106 and driven by cylinder units 107, so that the chucks 105 and the opened sections of the attaching members 85 are capable of clipping the upper sections of the pipes. Note that, front ends of the rods of the cylinder units 107 are rotatably attached to the rear faces of the attaching members 85 by pins 109.

Next, the guide section 74 will be explained.

The guide section 74 is provided under the pipe-inserting section 72.

Both end sections of a supporting plate 120 (see FIG. 4) are slidably attached to guide poles 121, which are vertically provided to the base 76. Thus, the supporting plate 120 is capable of moving in the vertical direction along the guide poles 121. Screw rods 122, which are rotatably provided to the base 76, are screwed through the supporting plate 120. The supporting plate 120 is moved to prescribed positions by rotating the screw rods 122 with a motor 123.

Figure 12:
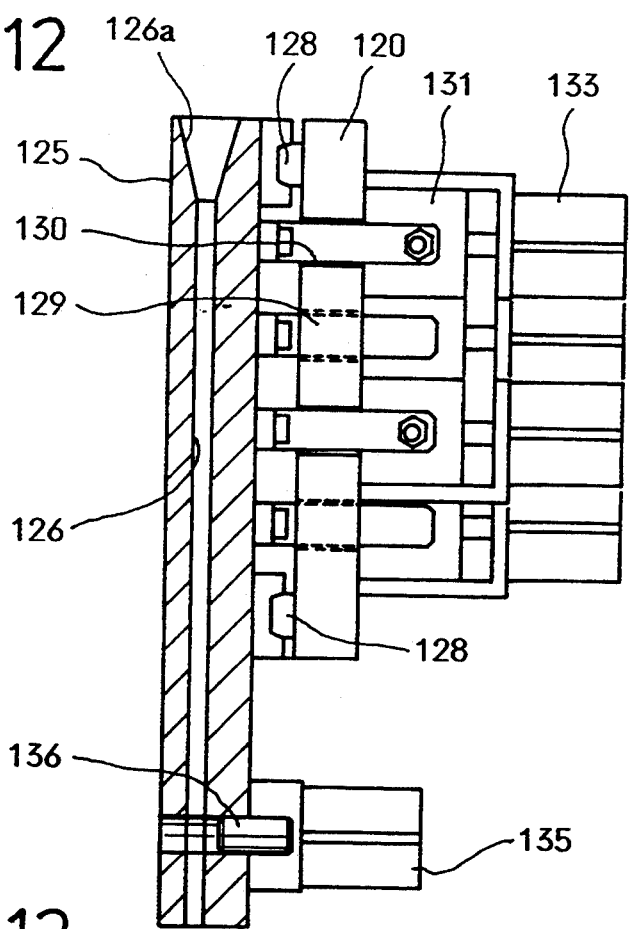
FIG. 12 is a partial sectional view of a guide section.
Figure 13:
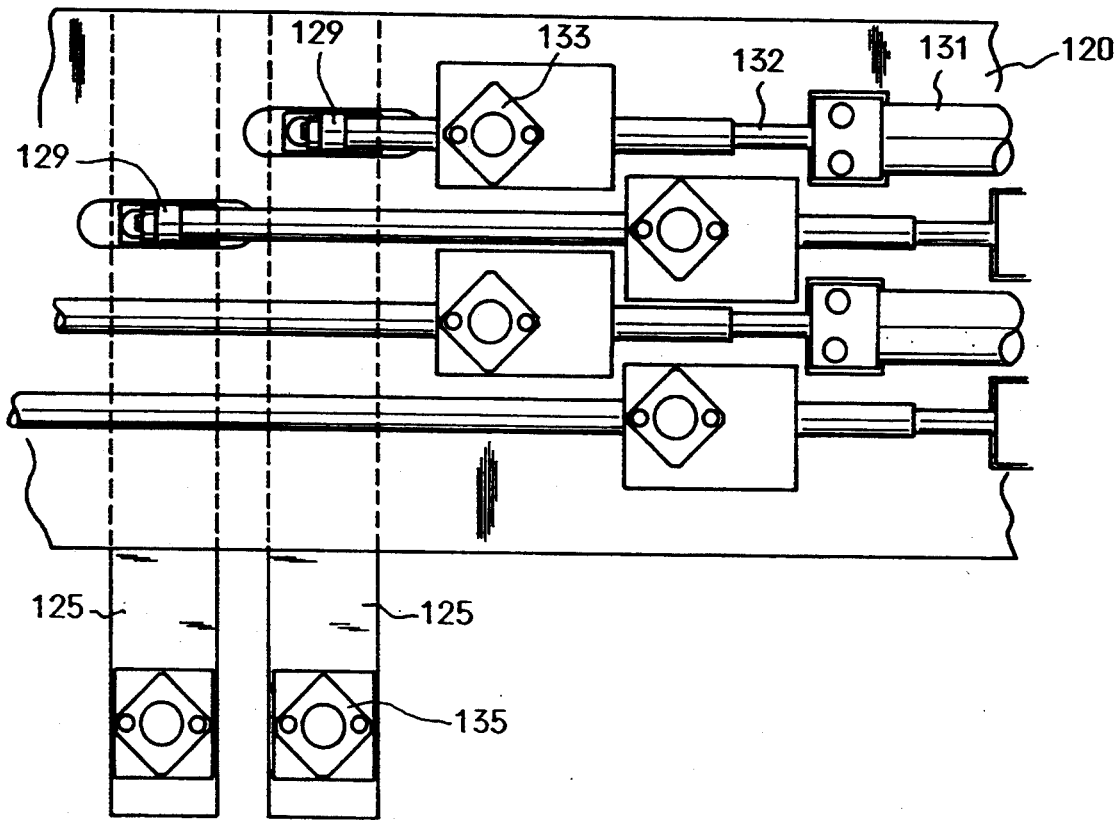
FIG. 13 is a partial front view of the guide section.

In FIGS. 12 and 14, there are provided nine limiting guide members 125, each of which corresponds to each inserting die unit 84 of the pipe-inserting section 72, on a rear face of the supporting plate 120. There are bored guide holes 126, through which the pipes 57 pass in the vertical direction, in the limiting guide members 125. Each upper section of the guide holes 126 is a large diameter section 126 a, whose inner diameter is gradually greater toward an upper end, as shown in FIGS. 12 and 14, so that lower ends of the pipes 57, which are inserted by the pip-inserting section 72, are easily guided into the guide hole 126 by the large diameter section 126a. An outer width of the U-shaped pipes 57 is defined by an inner face of the guide hole 126.

Each limiting guide member 125 is capable of moving in the transverse direction along rails 128, which are horizontally provided on the rear face of the supporting plate 120.

Fixed pins 129 are fixed on and project from front faces of the limiting guide members 125. The fixed pins 129 are slidably fitted into opening sections 130 of the supporting plate 120, and their front ends project form a front face thereof. Each front end of the fixed pins 129 is connected to each rod 132 of cylinder units 131 for positioning.

Cylinder units 133 and the cylinder units 131 constitute position adjusting means for positioning the limiting guide members 125 at three prescribed positions, whose constitution is as similar as the described position adjusting means, which includes the cylinder units 92 and 97 for positioning the inserting dies 87.

Cylinder units 135 are respectively provided on lower front faces of the limiting guide members 125. Each limiting member 136, which is provided at a front end of a rod of the cylinder unit 135, is capable of going into and coming out from each guide hole 126 of the limiting guide members 125.

In FIG. 15, there is a clearance through which the U-shaped pipe 57 passes between the inner face of each guide hole 126 and both side faces of each limiting member 136. An upper face of the limiting member 136 is a curved face. Therefore, the pipe 57 inserted in the guide hole 126 is guided by an upper face of the limiting member 136 into the clearance. By this guide, an outer edge of the pipe 57 contacts the inner face of the guide hole 126; an inner edge of the pipe 57 contacts the side faces of the limiting member 136, so that the outer width of the lower sections of the pipe 57 is precisely defined.

Next, a limiting section will be explained with reference to FIGS. 16 and 17.

The limiting section is located between the movable board 75 and the guide section 74 so as to limit the position of the lower ends of the pipes 57 and introduce to the guide section 74.

Two supporting plates 137 (one of the two is shown in FIG. 16) are attached to the movable boards 75. Each supporting plate 137 has a cylinder unit 138. A movable plate 139 is spanned between rods of the cylinder units 138, so that the movable plate 139 is moved in the vertical direction by the cylinder units 138.

There is attached a movable plate 141, which is capable of moving in the direction perpendicular to the paper face of FIG. 16 and which is driven by a cylinder unit 140, on a bottom face of the movable plate 139.

There is fixed a limiting plate 143, which has multiple V-notches 142 in a front face, to the movable plate 141 (see FIG. 17). There is provided a slide plate 144, which is capable of moving in the right-left direction in FIG. 17, between a bottom face of the movable plate 141 and the limiting plate 143. The slide plate 144 is connected to a rod of a cylinder unit 145, which is fixed on the movable pate 141, and driven by the cylinder unit 145. There are also formed rectangle notches 146 in a front face of the slide plate 144. The notches 142 and 146 form limiting holes 147. The limiting holes 147 open widely when the notches 142 and 146 are mutually coincided; the limiting holes 147 close when the slide plate 144 shifts (see FIG. 17 ). Clearance between the adjacent limiting holes 147 is the same as the width of the pipes 57 to be limited.

Successively, a pipe-inserting action will be explained.

As described above, the stack pin holders 29 on which the stacked fins 24 are held are transferred onto the second pallet 31 and conveyed by the circulating conveyor 30. Upon reaching the send-in section 50a below the pipe-inserting unit 50, the second pallet 31 is stopped thereat.

The limiting guide members 125 of the guide section 74 have been previously moved to a prescribed position of said three positions, to which the limiting guide members 125 are able to move, on the basis of arranging patterns of the pipe holes 23, by the cylinder units 131 and 133. Note that, in the present embodiment, there are nine limiting guide members 125 but all limiting guide members 125 are not always used. The limiting guide members 125 are selectively used on the basis of the number of the pipes 57 to be inserted.

A multiple U-shaped pipes 57 are supplied to the shooters 66 of the pipe-inserting section 72 from the pipe-supplying section 70, and one pipe 57 is supplied to and held at each lower end of the shooters 66.

When the sensors 69 detect the existence of the pipes 57, the movable plate 80 is retracted by the cylinder unit 83 (see FIG. 6), and the inserting die unit 84 moves until the chucks 105 locate immediately above the shooters 66 (see FIG. 5).

In this state, the motors 78 (see FIG. 4) are driven to descend the inserting die unit 84 with the movable board 75 and the movable plate 80, so that the chucks 105 descend until they correspond to upper sections of the pipes 57.

Figure 10:
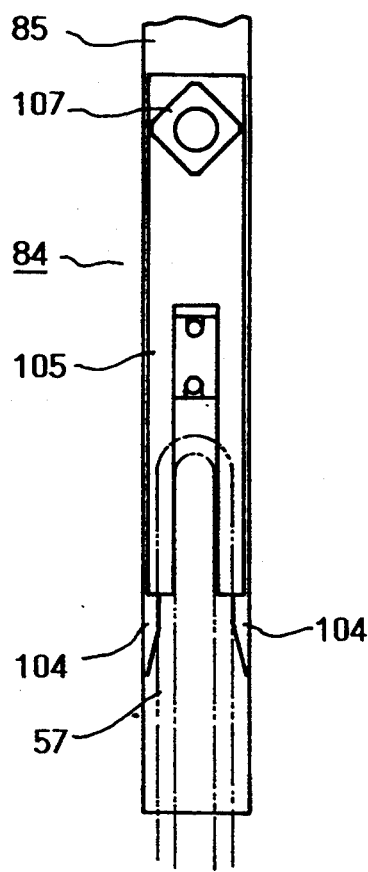
FIG. 10 is a partial front view of the inserting die unit.

In this step, as clearly shown in FIG. 10, the upper sections or the U-bent sections of the pipes 57 are introduced into clearances between the limiting guides 104 by downward movement of the inserting die unit 84, so that the width of the lower sections of the pipe 57 is limited. By limiting the width of the lower sections, deformation of the pipes 57 can be reformed. Note that, to prevent interference with the shooters 66 during descent, the chucks 105 are formed into fork shapes.

Next, the cylinder units 107 are driven to rotate the chucks 105 to clip the upper sections of the pipes 57 with the attaching members 85.

The inserting die unit 84 is lifted upward until reaching positions, at which the pipes 57 can be freely taken out, by the motors 78. Then the moving plate 80 is moved forward by the cylinder units; 83, and the inserting die unit 84 proceeds to the position immediately above the guide section 74 and stop there.

In this state, the cylinders 92 and 97 (see FIG. 9) are driven to move the inserting die unit 84 until the inserting die unit 84 reaches a position immediately above the limiting guide members 125. Namely, while the inserting die unit 84 moves toward the shooters 66 to take the pipes 57, the inserting die unit 84 moves along the arrangement of the shooters 66. On the other hand, while the inserting die unit 84 moves toward positions above the guide section 74, the inserting die unit 84 moves on the basis of the arranging pattern of the limiting guide members 125.

Note that, in case that the pattern of the pipe insertion is fixed, no mechanism for moving the inserting die unit 84 and the limiting guide members 125 are required. Namely, the shooters 66 may be fixed on the basis of said pattern.

Next, the cylinder unit 140 of the limiting section (see FIG. 16) is driven so as to move the movable plate 141 to base sections of the pipes 57, and the base sections of the pipes 57 go into the clearances between the notches 142 and 146 of the limiting plate 143 and the slide plate 144. Afterwards the slide plate 144 is slid, so that the pipes 57 reformed and limited their width by the limiting holes 147.

When the motors 78 are driven to descend the inserting die unit 84 together with the movable boards. 75, the lower sections of the pipes 57, which have been held by the chucks 105, are inserted into the guide holes 126 of the limiting guide members 125. Upon inserting the pipes 57 into the guide holes 126, the motors 78 are stopped, the chucks 105 release the pipes 57, and the inserting dies 87 are descended by the cylinder units 100, so that the pipes 57 are deeply inserted into the guide holes 126. After the lower end sections of the pipes 57 go into the guide holes 126, the width limitation by the limiting plate 143 and the slide plate 144 is released. While the pipes 57 go into the guide holes 126, the lower sections of the pipes 57 pass through the clearances between the inner faces of the guide holes 126 and tile side faces of the limiting members 136, which are project into the guide holes 126, so that the outer width and the inner width of the pipes 57 are limited to the prescribed width. The pipes 57 are further inserted, and the lower ends of the pipes 57 are inserted into the pipe holes 23 of the stacked fins 24.

In this state, the limiting members 136 are retracted from the guide holes 126, so that the inserting dies 87 are capable of passing. And the inserting dies 87 are further descended to further insert the pipes 57 into the stacked fins 24 until reaching prescribed depth.

Upon returning the inserting dies 87, the movable board 75, etc. upward to initial positions, the stack pins 28 are pulled out pull-insert units 54 having proper chuck units.

Next, the stack pin holders 29 with the second pallets 31 are conveyed to the position in front of the pipe-inserting unit 51 by the circulating conveyor 30 and stop there. The pipe-inserting unit 51 similarly inserts the pipes 57 into the rest pipe holes 23 including the pipe holes from which the stack pins 28 have been pulled out so as to form the fin units.

The fin units will be completed, as described above, by expanding tubes with known tube expanders.

Vacant stack pin holders 29 from which the fin units have been removed are, as described above, conveyed on the circulating conveyor 30 together with the second pallets 31. While the vacant stack pin holders 29 are conveyed, the stack pins 28 are inserted again. At the position C, the vacant stack pin holders 29 are transferred from the second pallets 31 to the first pallets 27 on the circulating way 26 by the transferring unit 25a.

Successively, the pull-insert units 54 will be explained.

The pull-insert units 54 are respectively provided to positions in front of the pipe-inserting units 50 and 51. The pull-insert units 54 bridge over the outward way and the return way of the circulating conveyor 30 (see FIG. 1). Note that, the pull-insert unit 54 which corresponds to the pipe-inserting unit 50 is a first pull-insert unit; the pull-insert unit 54 which corresponds to the pipe-inserting unit 51 is a second pull-insert unit. Structures of the first and the second pull-insert units 54 are same, so the structure of the first pull-insert unit 54 is explained and the other is omitted.

In FIG. 20, the outward way 30 A of the circulating conveyor 30 runs on front sides of the pipe-inserting units 50 and 51. The return way 30 B of the circulating conveyor 30 runs in parallel to the outward way 30 A with prescribed separation.

Cylinder units 150 are provided on a base section and headed downward. Rods 151 of the cylinder units 150 are capable of extending and retracting in the vertical direction. Each front end of a rod 151 is connected to a movable plate 153, which is capable of moving in the vertical direction along guides 152 (see FIG. 21). There is provided a cylinder unit 155, whose rod 154 is capable of extending and retracting in the direction perpendicular to the rod 151, on the movable plate 53 (see FIG. 20). There is provided an attaching plate 156 at a front end of the rod 154. There are provided two chuck units 157 to the attaching plate 156, and the chuck units 157 are capable of holding two stack pins 28 in one fin unit.

A fin press unit 160 is provided below the chuck units 157. The fin press unit 160 has a movable plate 162, which is moved in the vertical direction by a cylinder unit 161. There are fixed two cylinder units 163 (one of the two is shown) to the movable plate 162. L-shaped press plates 164 are respectively provided to each rod of the cylinder units 163. The L-shaped press plates 164 press the fins 24 downward.

A cylinder unit 166 is capable of moving from the outward way 30 A and the return way 30 B along a rail 167. A rod 168 of the cylinder unit 166 is capable of moving in the vertical direction. An attaching plate 169 is fixed to a lower end of the rod 168. The cylinder 165 is moved by a motor 165. There is provided a movable plate 171, which is moved by a cylinder unit 170, to the attaching plate 169. There are provided two chuck units 173, which correspond to the chuck units 157, on an upper front face of the movable plate 171. Furthermore, there is provided a cylinder unit 174 on a center front face of the movable plate 171 (see FIGS. 22 and 23 ). A movable plate 176 is attached to a lower end of a rod 175 of the cylinder unit 174, so that the movable plate 176 is moved in the vertical direction. The movement of the movable plate 176 is guided by guide poles 177. There are provided two chuck units 178 positions below the chuck units 173.

An inserting unit 180 (see FIGS. 20, 24 and 25 ), which corresponds to the pipe-inserting unit 50, is provided to a position, which is under the cylinder unit 166 when the cylinder unit 166 is on the return way 30B. Note that, another inserting unit, whose structure is the same as the unit 180, is provided for the pipe-inserting unit 51.

The inserting unit 180 has a movable plate 182, which is moved in the vertical direction by a motor 181 (see FIGS. 24 and 25). The motor 181 rotates screw rods 183 (one is shown) to move the movable plate 182. The movable plate 182 is moved along guide rails 184 (one is shown). There is attached a movable plate 186, which is moved back and forth by cylinder units 185 (one is shown), to the movable plate 182. Further, two chuck units 188, which correspond to the chuck units 178, are provided on an upper front face of the movable plate 186. And two chuck units 189 (one of the two is shown) are provided under the chuck units 188 with proper separation.

Pulling action and inserting action will be explained.

As described above, the stack pins 28 are pulled out after the pipes 57 are inserted into the pipe holes 23 of the stacked fins 24. Since the pipes 57 work to hold the stacked fins 24 instead of the stack pins 28 after the pipe insertion.

The stack pins 28 pulled out are inserted into the holes 32 of the stack pin holders 29 from which the stacked fins 24, to which the pipes 57 have been inserted and from which the stack pins 28 have been pulled out as the fin units, have been removed as described above.

Firstly, actions of pulling the stack pins 28 from the fin units to which the pipes 57 have been inserted and inserting the stack pins 28 pulled out into the vacant stack pin holders 29 will be explained.

The stacked fins 24 are pressed downward and held by the fin press unit 160. Namely, the press plates 164 are moved to positions above the fins 24 by the cylinder units 163. Then the press plate 164 is descended by the cylinder units 161 to press the fins 24.

Next, the rod 151 of the cylinder unit 150 is descended to a proper position. The chuck units 157 are moved forward by the cylinder unit 155 and driven to hold the stack pins 28. The rod 151 with the stack pins 28 is ascended. Upon the stack pins 28 reaching a proper position, the cylinder unit 150 is stopped.

The cylinder unit 166 has been located at the position shown by two-dot chain lines (see FIG. 20). The chuck units 173 and 178 are mowed forward by the cylinder unit 170. Upon reaching a proper position, the chuck unit 173 is driven to hold the stack pins 28. Then the chuck units 157 release the stack pins 28 to transfer them to the cylinder unit 166.

In this state, the cylinder unit 166 is moved from an upper section of the outward way 30 A to an upper section of the return way 30B by the motor 165. During the movement, the chuck units 178 descend to a proper position by the cylinder unit 174. At the proper position, the chuck units 178 are driven to hold mid sections of the stack pins 28. With this action, vibration of the stack pins 28 is prevented, and the stack pins 28 are conveyed to the position over the return way 30B. Next, the stack pins 28 descend to a proper position by the cylinder unit 166. At the proper position, the cylinder unit 166 is stopped, and the chuck units 188 and 189 are moved forward by the cylinder units 185 of the inserting unit 180 to hold the stack pins 28 at proper positions. When the chuck units 173 and 178 release, the stack pins 28 are transferred to the inserting unit 180.

Then the the chuck units 188 and 189, which are holding the stack pins 28, are descended by the motor 181. By this downward movement, the stack pins 28 are inserted into the holes 32 of the stack pin holders 29.

Steps of pulling out and inserting the stack pins 28 will be shown in FIG. 26.

A position 0 is a first pulling position for the pipe-inserting unit 50; a position P is a second pulling position for the pipe-inserting unit 51; a position Q is a first inserting position, which corresponds to the second pulling position P, on the return way 30B; and a position R is a second inserting position, which corresponds to the first pulling position 0, on the return way 30B.

At the first pulling position 0, the stack pins 28 in a outer rows are pulled out, and the stack pins 28, which have pulled out by the first pull-insert unit 54, are conveyed to the position over the second inserting position R by the cylinder unit 166 to stand by.

At the second pulling position P, the stack pins 28 in inner rows are pulled out, and the stack pins 28, which have been pulled out by the second pull-insert unit 54, are similarly conveyed and inserted into the holes 32 in the inner rows.

The stack pin holders 29 having the stack pins 28 inserted into the holes 32 in the inner rows are conveyed to the second inserting position R. The cylinder unit 166 of the first pull-insert unit 54, which has been standing by, is driven. And the inserting unit 180 is also driven to insert the stack pins 28 into the holes 32 in the outer rows. At that time, since the chuck units 188 and 189 of the first pull-insert unit 54 are located on an outer side of the stack pins 28 which have already been inserted, no interference occurs. Thus, at the second inserting position R, the rest of the stack pins 28 can be inserted from an outer side.

The stack pins 28, which have been pulled out by the cylinder unit 150, are received by the cylinder unit 166 and further received by the inserting unit 180 to insert. With this structure, the stack pins 28 can be precisely positioned and vibration of the stack pins 28 can be prevented, so that the stack pins 28 are capable of pulling out and inserting easily.

Another example of pulling out and inserting the stack pins 28 will be explained with reference to FIG. 27.

In the present example, the stack pins 28 are not transferred. The cylinder unit 150 of the first pull-insert unit 54 is capable of pulling out and inserting the stack pins 28. In this case, the stack pins 28, which have pulled out at a pulling position of the outward way 30A, are inserted into the holes 32 in the outer rows at an inserting position of the return way 30 B then the rest of the stack pins 28 are inserted in the holes 32 in the inner rows. Namely, the stack pins 28 are freely pulled out and inserted without occurring interference with the chuck units, etc.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In an assembling apparatus for a heat exchanger, comprising:

a plurality of stack pin holders; and a plurality of stack pins extending upwardly from upper faces of said stack pin holders, said stack pins being capable of piercing through multiple fins, which have been stacked onto said stack pin holders with predetermined clearances and each of which has pipe holes through which U-shaped pipes are pierced, wherein the improvement comprises:

a send-in section in which said stack pin holders are set at predetermined positions, said send-in section being capable of keeping said stack pins extending upwardly;

a plurality of supporting sections for vertically holding said pipes whose U-bent sections are located at the uppermost position;

a pipe inserting section having a plurality of holding means, which are capable of receiving said pipes from said supporting sections to hold, and a plurality of inserting dies for pushing said pipes downward; and a guide section being provided above said send-in section, said guide section having a plurality of guide holes into which said pipes pushed by said inserting dies are inserted, said guide holes being capable of limiting an outer width of said pipes and introducing said pipes into the pipe holes of said fins.

2. The assembling apparatus according to claim 1, further comprising a limiting section being provided between said holding means and said guide section, said limiting section being capable of making an outer width of lower ends of said pipes, which have been held by said holding means, equal to a width of said guide holes.

3. The assembling apparatus according to claim 1, wherein a width of an upper section of each said guide hole gradually increases upwardly.

4. The assembling apparatus according to claim 1, further comprising a limiting member for forming a clearance between a side face and inner faces of said guide holes, whereby said pipes are capable of passing through said clearances and being inserted into said guide holes.

5. The assembling apparatus according to claim 1, wherein upper faces of said supporting sections are formed into sloops, and said supporting sections work as shooters, which are capable of holding said pipes at the U-bent sections, and said pipes are supplied to said shooters by a pipe supplying section.

6. The assembling apparatus according to claim 1, wherein said holding means and said inserting dies are provided on a movable plate, which is capable of moving close to and being separated away from said supporting sections.

7. The assembling apparatus according to claim 6, wherein said movable plate is movably supported on a movable board, which is capable of moving in the vertical direction.

8. The assembling apparatus according to claim 1, wherein said guide section has a supporting plate, which is capable of moving in the vertical direction, and a limiting guide member, which has said guide holes bored in the vertical direction, is provided on said supporting plate.

9. The assembling apparatus according to claim 8, wherein a plurality of said supporting sections, said holding means, said inserting dies and said limiting guide members are arranged in the transverse direction with respect to said pipe holes of said fins.

10. The assembling apparatus according to claim 9, further comprising position adjusting means being capable of allowing said holding means, said inserting dies and said limiting guide members to move in the transverse direction and stopping them at predetermined positions.

11. An assembling apparatus for a heat exchanger, comprising:
a plurality of stack pin holders;
a plurality of stack pins extending upwardly from upper faces of said stack pin holders, said stack pins being capable of piercing through multiple fins, which have been stacked onto said stack pin holders with predetermined clearances and each of which has pipe holes through which U-shaped pipes are pierced;
a pipe inserting section for inserting said pipes downward into the pipe holes of said fins;
a plurality of first pallets for holding a plurality of stack pin holders, on which multiple fins have been stacked, in parallel;
a circulating way for circulating said first pallets via first and second transferring positions, at which said stack pin holders are transferred;
a pallet-circulating way for circulating a plurality of second pallets one by one via a fourth transferring position, which corresponds to the first transferring position of said circulating way, said pipe-inserting section and a fifth transferring position, which corresponds to the second transferring position of said circulating way;
a first transferring unit for transferring said stack pin holders one by one from said first pallets being located at the first transferring position of said circulating way, onto said second pallets, which correspond to the first transferring position thereof, on said pallet-circulating way; and
a second transferring unit for transferring said stack pin holders one by one from said second pallets, from which said fins, which have been pierced by said pipes, are removed to be vacant while conveying on said pallet-circulating way, onto said first pallets being located at the second transferring position.

12. The assembling apparatus according to claim 11, wherein said circulating way has a stack position at which said fins, which have been made by a press unit, are stacked onto said stack pin holders, which have been transferred onto said first pallets, so as to be pierced.

13. The assembling apparatus according to claim 12, wherein said stack pin holder has a support-hole, into which a finger pin is capable of inserting, on a front face, and said first transferring unit and said second transferring unit have said finger pins for supporting and lifting said stack pin holders.

14. The assembling apparatus according to claim 13, wherein said first and second transferring units have pressing sections, which are capable of contacting upper faces of said stack pin holders when said stack pin holders are lifted.

15. An assembling apparatus for a heat exchanger, comprising:
a plurality of stack pin holders;
a plurality of stack pins extending upwardly from upper faces of said stack pin holders, said stack pins being capable of piercing through multiple fins, which have been stacked onto said stack pin holders with predetermined clearances and each of which has pipe holes through which U-shaped pipes are pierced;
a pipe inserting section for inserting said pipes downward into the pipe holes of said fins;
an outward way of conveying said stack pin holders on which said fins are stacked via said pipe-inserting section;
a return way being arranged in parallel to said outward way, said return way conveying said stack pin holders, which have been vacant while being conveyed on said outward way; and
a pull-insert unit being provided to bridge over said outward way and said return way, said pull-insert unit being capable of pulling out said stack pins from said stack pin holders after said pipes are pulled out on said outward way and inserting said stack pins into stack pin holes of said stack pi holders on said return way.

16. An assembling apparatus for a heat exchanger, comprising:

a plurality of stack pin holders;

a plurality of stack pin being arranged in two rows on upper faces of said stack pin holders and extending upwardly therefrom, said stack pins being capable of piercing through multiple fins, which have been stacked onto said stack pin holders with predetermined clearances and each of which has pipe holes through which U-shaped pipes are pierced;

a plurality of pipe inserting sections of inserting said pipes downward into he pipe holes of said fins;

an outward way for conveying said stack pin holders on which said fins are stacked in two rows via said pipe-inserting sections;

a return way being arranged in parallel to said outward way, said return way conveying said stack pin holders, which have been vacant while being conveyed on said outward way;

a first pulling position on said outward way at which said stack pines in an outer row are pulled out from said stack pin holders after said pipes are inserted on said outward way;

second pulling position provided head of said first pulling position on said outward way at which said stack pins in an inner row are pulled out from said stack pin holders;

a first inserting position provided to correspond to said second pulling position on said return way at which has stack pins, which have been pulled out at said second pulling position, are inserted into vacant stack pin holes in inner row of said stack in holders;

a second inserting position provided ahead of said first inserting position to correspond to said first pulling position on said return way at which said stack pins, which have been pulled out at said first pulling position, are inserted into vacant stack pin holes in an outer row of said stack pin holders;

a first pull-insert unit being provided to bridge over said first pulling position and said second inserting position, said first pull-insert unit being capable of pulling out said stack pins in the outer row from said stack pin holders at said first pulling position, conveying said stack pins, which have been pulled out, above said second inserting position prior to conveying said stack pin holders thereto, and inserting said stack pins into said stack pin holes in the outer row of said stack pin holders when said stack pin holders, whose said stack pins in the inner row have been inserted, are conveyed; and a second pull-insert unit being provided to bridge over said second pulling position and said first inserting position, said second pull-insert unit being capable of pulling out said stack pins in the inner row from said stack pin holders at said second pulling position, conveying said stack pins, which have been pulled out, to said first inserting position, and inserting said stack pins into said stack pin holes in the inner row of said stack pin holders, which have been conveyed to said first inserting position.

* * * * *